US012600174B2

(12) United States Patent (10) Patent No.: US 12,600,174 B2
Eikermann (45) Date of Patent: Apr. 14, 2026

(54) PNEUMATIC VEHICLE TYRE WITH CIRCUMFERENTIAL CHANNEL

(71) Applicant: Continental Reifen Deutschland GmbH, Hannover (DE)

(72) Inventor: Wilke Eikermann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/247,922

(22) PCT Filed: Oct. 4, 2021

(86) PCT No.: PCT/DE2021/200140
§ 371 (c)(1),
(2) Date: Apr. 5, 2023

(87) PCT Pub. No.: WO2022/073565
PCT Pub. Date: Apr. 14, 2022

(65) Prior Publication Data
US 2023/0373252 A1 Nov. 23, 2023

(30) Foreign Application Priority Data

Oct. 5, 2020 (DE) ..................... 10 2020 212 560.0

(51) Int. Cl.
B60C 11/13 (2006.01)
B60C 11/03 (2006.01)
(Continued)

(52) U.S. Cl.
CPC .......... B60C 11/0323 (2013.01); B60C 11/04 (2013.01); B60C 11/1281 (2013.01); B60C 11/1323 (2013.01); B60C 2200/06 (2013.01)

(58) Field of Classification Search
CPC ............. B60C 11/0323; B60C 11/1281; B60C 11/1323
See application file for complete search history.

(56) References Cited

U.S. PATENT DOCUMENTS 2,322,505 A * 6/1943 Bull ........................ B60C 11/04
152/DIG. 1
2,843,172 A 7/1958 Berry
(Continued)

FOREIGN PATENT DOCUMENTS

DE 102005042903 A1 3/2007
DE 102017208010 A1 11/2018
(Continued)

OTHER PUBLICATIONS

Machine translation for Japan 2001-206015 (Year: 2024).*
(Continued)

*Primary Examiner* — Steven D Maki
(74) *Attorney, Agent, or Firm* — Richard A. Wolf; Gregory Adams

(57) ABSTRACT

A pneumatic vehicle tire having a tread with profiling and at least one circumferential groove which runs in encircling fashion in the circumferential direction and is formed to a profile depth. At least over part of the circumference the groove has a cross section perpendicularly to the circumferential direction made up of at least two groove portions adjoining one another in a radial direction. A first groove portion is symmetrical with respect to the radial direction. The width of said groove portion in the axial direction is less than 3 mm and does not vary by more than 10%. A second radially inner groove portion is made wider in the axial direction in comparison with the first groove portion. It has the largest cross-sectional area of all the groove portions. Its cross-sectional area is asymmetrical to the radial direction, extends on both sides of the radial direction and has an edge without corners in the bottom region of the circumferential groove.

8 Claims, 5 Drawing Sheets

(51) Int. Cl.
  B60C 11/04       (2006.01)
  B60C 11/12       (2006.01)

(56)          References Cited

U.S. PATENT DOCUMENTS

| | | | | |
|---|---|---|---|---|
| 4,703,787 A | * | 11/1987 | Ghilardi | B60C 11/032 |
| | | | | 152/DIG. 3 |
| 2010/0116395 A1 | | 5/2010 | Andou | |
| 2012/0227883 A1 | * | 9/2012 | Audigier | B60C 11/0309 |
| | | | | 152/209.18 |
| 2018/0147894 A1 | * | 5/2018 | Haseda | B60C 11/1323 |
| 2018/0162176 A1 | | 6/2018 | Haseda | |
| 2018/0170116 A1 | * | 6/2018 | Daries | B60C 11/13 |
| 2018/0244111 A1 | | 8/2018 | Zhu | |
| 2018/0345733 A1 | | 12/2018 | Ooba | |
| 2020/0070586 A1 | | 3/2020 | Ocana Amezcua et al. | |
| 2021/0039444 A1 | * | 2/2021 | Taniguchi | B60C 11/032 |

FOREIGN PATENT DOCUMENTS

| | | | |
|---|---|---|---|
| JP | 2001-206015 A | * | 7/2001 |
| JP | 2002079809 A | | 3/2002 |
| WO | 2014178186 A1 | | 11/2014 |
| WO | 2017176280 A1 | | 10/2017 |

OTHER PUBLICATIONS

The International Search Report and the Written Opinion of the International Searching Authority mailed on Nov. 30, 2021 for the counterpart PCT Application No. PCT/DE2021/200140.

Notice under Rule 71(3) EPC date Jul. 9, 2024 for the counterpart European Patent Application No. 21 798 279.2 and machine translation of same.

Preliminary Office Action published Nov. 21, 2024 for the counterpart Brazilian Patent Application No. 112023005279-3 and machine translation of same.

BR Office Action dated Sep. 24, 2025 of counterpart Brazilian Patent Application BR112023005279-3.

* cited by examiner

PNEUMATIC VEHICLE TYRE WITH CIRCUMFERENTIAL CHANNEL

The invention relates to a pneumatic vehicle tire, having a tread which has a profiling and which has at least one circumferential groove which runs in encircling fashion in the circumferential direction of the pneumatic vehicle tire and is formed to a profile depth PT. At least over part of the circumference of the pneumatic vehicle tire, at least one circumferential groove has a cross section perpendicularly to the circumferential direction that is made up of at least two groove portions adjoining one another in a radial direction R of the pneumatic vehicle tire.

PRIOR ART

It is known and customary to provide the tread of pneumatic utility vehicle tires with circumferential grooves running in encircling fashion in the circumferential direction. Such circumferential grooves mutually separate circumferential ribs which can be provided with further grooves, for example transverse grooves, which impart a block-type structure to the circumferential ribs. Circumferential grooves with a cross section perpendicular to the circumferential direction of the pneumatic utility vehicle tire, which in the radial direction R only has one groove portion, are widespread in treads of pneumatic utility vehicle tires. In a tire, the radial direction R is the direction which faces outward from the axis of rotation of the tire, which defines the axial direction A of the tire, i.e. the center, of the tire or of the hub of the rim supporting the tire, perpendicular to the axis of rotation. In this direction, the centrifugal force acts on the tire when a wheel equipped with the pneumatic utility vehicle tire rotates. A groove portion in the radial direction R of a cross section of a circumferential groove perpendicular to the tire circumferential direction is distinguished by a certain geometric shape of the cross section of the groove portion perpendicular to the tire circumferential direction, which clearly differs from the geometric shape of the cross section of another groove portion perpendicular to the tire circumferential direction. Therefore, if a circumferential groove has only one groove portion in the radial direction R, its cross section perpendicular to the tire circumferential direction can be described by a geometric shape. Circumferential grooves having only one groove portion have, for example, a V-shaped or U-shaped cross section perpendicular to the tire circumferential direction.

The cross section of a circumferential groove can have a lowest point in its bottom region, at which the distance to the surface of the tread is greatest, which then corresponds to the profile depth PT of the circumferential groove in an unused tire. In this case, the bottom region of the circumferential groove is the region of the circumferential groove at which the groove is deepest, as viewed from the surface of the tire tread, or which represents the innermost region of the circumferential groove, since here the distance from the circumferential groove to the center of the tire or hub of the wheel carrying the tire is smallest. This innermost region of a circumferential groove, its bottom region, includes the lowest point of a cross section of the circumferential groove, which is at the greatest distance, in the new condition of the pneumatic vehicle tire the profile depth PT, from the surface of the tread, and the region of the circumferential groove, the distance of which In the new condition of the pneumatic vehicle tire is greater than 90% of the profile depth PT from the surface of the tread. The deepest point of a cross section in the bottom region of a circumferential groove can be precisely one point on the edge of the circumferential groove. However, it is equally possible that there is not a lowest point of the cross section of the circumferential groove, but rather a straight line in the bottom region of the circumferential groove. In a cross section perpendicular to the circumferential direction, this straight line extends in the axial direction A over a certain length, runs parallel to the surface of the tread and is at the greatest distance from the surface of the tread, which corresponds to the profile depth PT in an unused tire. The edge of the cross section of the circumferential groove perpendicular to the circumferential direction then has two sides in the axial direction A of the tire, which abut at a single lowest point in the bottom region of the circumferential groove and, with a straight line in the bottom region of the circumferential groove that is at the greatest distance from the circumferential groove to the surface of the tread, are arranged in the axial direction to the side of this straight line. If a circumferential groove is not arranged axially centrally in the tread of a tire, one side of the circumferential groove faces the center of a pneumatic vehicle tire and the other the outside of a pneumatic vehicle tire. Both sides are in the form of groove flanks, which typically form an angle with respect to the radial direction R. This may differ depending on the depth of the circumferential groove, but is often constant at least over a certain range of the depth of the circumferential groove, i.e. the distance of the circumferential groove from the surface of the tread. Then, the edge of one side of the circumferential groove is formed by a straight line which is perpendicular to the circumferential direction and encloses a constant angle with the radial direction R. A groove portion in which the sides of the circumferential groove are almost or exactly parallel to the radial direction has a U-shaped profile. In this groove portion, the tangent of the sides perpendicular to the circumferential direction encloses an angle which is not greater than 10° with the radial direction. In particular, the tangent can run parallel to the radial direction.

If, on the other hand, the two sides approach one another in a groove portion with increasing depth of the circumferential groove at an angle of more than 10° with respect to the radial direction R, the groove portion has a V-shaped cross section. With an exact V-shaped cross section, the angle is the same over the depth of the circumferential groove, and therefore the groove flanks of the cross section are straight lines.

The shape of the groove flanks is usually the same on both sides of the circumferential groove, and therefore the cross section of the circumferential groove perpendicular to the circumferential direction is symmetrical to the radial direction R.

In the case of a U-shaped cross section, the groove has either a very slight curvature with a deepest point at which the distance to the surface of the tread corresponds to the profile depth PT in the case of an unused tire in its lowest bottom region, the groove bottom, or a surface in the axial direction, at which the distance from the surface of the tread corresponds to the profile depth PT in an unused tire.

In contrast, with a V-shaped cross section, both sides of a circumferential groove can converge directly at the deepest point of the circumferential groove.

However, a tread of pneumatic utility vehicle tires can also have circumferential grooves with a cross section perpendicular to the circumferential direction of the pneumatic utility vehicle tire with only one groove portion in the radial direction R, the cross section not being symmetrical to the radial direction R. Pneumatic vehicle tires with circumferential grooves that have such a cross section perpendicular to the circumferential direction of the pneumatic utility vehicle tire are known from DE 10 2005 042 903 A1. Both sides of the disclosed circumferential grooves are in the form of groove flanks, which are designed as straight lines above the bottom region of the circumferential groove and which form a small angle of inclination with respect to the radial direction R. These small angles of inclination (a and B) differ on both sides of the groove. The straight portions of the groove flanks on both sides of the circumferential grooves reach as far as the surface of the tread of the pneumatic vehicle tires shown. Very similar circumferential grooves are also described in WO 2017/176280 A1. The circumferential grooves shown differ only in terms of which side of the circumferential groove, the side toward the center of a pneumatic vehicle tire or the side toward the outside of a pneumatic vehicle tire has the smaller angle of inclination with respect to the radial direction R. In the case of the circumferential groove described in DE 10 2005 042 903 A1, the side toward the center of a pneumatic vehicle tire preferably has the smaller angle of inclination. Owing to the greater angle of inclination of the side of the circumferential groove that faces the outside of the pneumatic vehicle tire, the profile of the tread obtains increased transverse rigidity toward the outside. In addition, owing to the greater angle of inclination, there is less compression in the groove base directed toward the outside of the pneumatic vehicle tire, and therefore the risk of groove fractures in this region is reduced.

However, significantly more complex configurations of the cross sections perpendicular to the circumferential direction of circumferential grooves are also known, in which case the cross section can be made up of two or three groove portions adjoining one another in a radial direction R of the pneumatic vehicle tire.

In known configurations, the cross section comprises a first groove portion that is symmetrical to the radial direction R of the pneumatic vehicle tire and the width of which in the axial direction A is constant, and a radially inner second groove portion that adjoins the first one in the radial direction, is wider than the first groove portion in the axial direction A and comprises the bottom region of the circumferential groove.

In such a known form of such circumferential grooves 1 in a tread 2 of a pneumatic vehicle tire, of which one example is shown in FIG. 1, the cross section thereof perpendicular to the circumferential direction also has an outer third groove portion 3, which widens outward and is symmetrical to the radial direction R of the pneumatic vehicle tire. A first groove portion 4 adjoins this third outer first groove portion 3 in the radial direction (in the opposite direction to the direction of the arrow). Said first groove portion is narrowed in the axial direction A in relation to the third groove portion 3 and is symmetrical to the radial direction R of the pneumatic vehicle tire. A second groove portion 5 adjoins this first groove portion 4 in the radial direction (in the opposite direction to the direction of the arrow). This radially inner groove portion 5 has a cross section which is widened in the axial direction A in comparison with the first groove portion 4.

Such circumferential grooves of a pneumatic vehicle tire are known from U.S. Pat. No. 2,843,172. In this case, the third groove portion, which widens outward, is symmetrical to the radial direction R of the pneumatic vehicle tire only in certain positions over the circumference of the pneumatic vehicle tire, since this groove portion over the circumference has a winding shape, which may be sinusoidal or zigzag-shaped, in the axial direction A. In comparison with said third groove portion, the first groove portion has a reduced width in the axial direction A and is symmetrical to the radial direction R of the pneumatic vehicle tire. A second groove portion located radially on the inside can have a cross section that is widened in the axial direction A in comparison with the first groove portion and is also symmetrical to the radial direction R of the pneumatic vehicle tire. The edge of the cross section perpendicular to the circumferential direction has an angular shape in the bottom region of the circumferential groove. The width of the circumferential groove in the axial direction is almost unchanged over most of the height of the second groove portion in the radial direction, since initially the width of the cross section of the second groove portion perpendicular to the circumferential direction of the tire in the axial direction A has increased constantly to a maximum width with increasing distance from the surface of the tread. In this region of the second groove portion, the edge of the cross section of the second groove portion is formed by a straight line. The height of a groove portion is the maximum extent of the groove portion in the radial direction R. The region of almost unchanged width forms the innermost region of the second groove portion, which is at the greatest distance from the surface of the tread of the pneumatic vehicle tire, and therefore also includes the bottom region of the circumferential groove, which is formed by a surface in the axial direction A, in which the distance from the surface of the tread corresponds to the profile depth PT of the circumferential groove in an unused tire. In this innermost region, too, the edge of the cross section of the second groove portion is formed by a straight line on both sides, and therefore the groove flanks of the second groove portion have a contour perpendicular to the circumferential direction of the tire that substantially consists of two straight portions. The inner straight portions of the groove flanks form corners with the surface of the bottom region.

Furthermore, an embodiment of the known form of circumferential grooves is also disclosed in DE 10 2017 208 010 A1. Here, the cross section of the circumferential groove perpendicular to the circumferential direction has an outer third groove portion having a funnel shape as a cross section, the funnel shape being symmetrical to the radial direction R of the pneumatic vehicle tire. Said outer third groove portion is adjoined in the radial direction by a first groove portion with a constant width in the axial direction A, which corresponds to the smallest width in the axial direction A of the third groove portion. This first groove portion is also symmetrical to the radial direction R of the pneumatic vehicle tire. A second inner groove portion adjoins this first groove portion in the radial direction R. It has a cross section which is widened in the axial direction A in comparison with the first groove portion. It has two top flanks by which the width of the second groove portion is widened symmetrically to the radial direction R up to a maximum value in the axial direction A at a greater distance from the surface of the tread of the tire shown. As the distance from the tread surface increases further, the width of the groove portion then slowly decreases in the axial direction until the bottom region of the groove is reached, at which the maximum profile depth PT of the groove is present. Here, the cross section of the second groove portion perpendicular to the circumferential direction, arranged symmetrically to the radial direction R, has straight lines on both sides of the groove portion at its edge, which converge with increasing distance from the tread surface at a small angle of inclination to the radial axis R, until they reach the bottom region of the groove portion, which is formed by a surface perpendicular to the radial direction R in the axial direction A. The angle of inclination of the converging straight lines to the radial direction R is typically in the range from 5° to 25°.

The circumferential grooves described above, which have three groove portions that follow one another in the radial direction, have reduced rolling resistance in the radial direction R because of the central groove portion of small width, since the flanks of the circumferential groove in this groove portion touch when the flanks of the circumferential groove come into contact with the road, which means that further radial deformation due to the vehicle weight in the tread of the pneumatic vehicle tire is prevented in the region of the circumferential groove. In addition, the contact pressure is reduced in this region by the groove flanks touching, which leads to a reduction in tire wear.

In addition, the circumferential grooves described above had good drainage properties owing to the large cross section of the inner second groove portion. As a result, the aquaplaning behavior of the pneumatic vehicle tire is improved as the profile abrasion increases.

The problem of groove fractures, which is increased particularly in the shoulder region of pneumatic vehicle tires and thus in the outer grooves, which are arranged in the axial direction on the outside in the tread of the pneumatic vehicle tire, has hitherto been solved in the case of the circumferential grooves described above, which have three groove portions that follow one another in the radial direction, by providing sipes, i.e. incisions, mostly regularly arranged on the outer surface of the tread. However, with increasing abrasion of the tread of the pneumatic vehicle tire over the course of use, the sipes on the surface are also abraded. Accordingly, the risk of groove fractures hitherto increases with increasing tire use due to the associated abrasion of the tread.

Circumferential grooves with a cross section perpendicular to the circumferential direction are also known in a pneumatic vehicle tire that comprises only the first and the second groove portion. Due to a small width of the first groove portion, when the first groove portion contacts the road, the second groove portion may become a channel which is no longer connected to the tread surface. As shown in US 2018/0244111 A1, openings can then be provided in the circumferential groove in order to allow water from the road surface to get into the channel of the second groove portion when it is wet, thereby reducing the risk of aquaplaning.

In general, in the case of a circumferential groove described above, the cross section of which perpendicular to the circumferential groove is made up of at least two groove portions, and depending on the tire wear that has occurred and the profile depth that remains as a result, there is a different aquaplaning behavior. First of all, an outer third groove portion, if present, can cause a first aquaplaning behavior, but this only corresponds to a limited extent to the performance of an open circumferential groove. e.g. with a U-shaped profile. If, by contrast, the first groove portion is directly on the surface of the tread of the pneumatic vehicle tire, in particular due to the rubber abrasion of the tire, the circumferential groove no longer contributes to a positive aquaplaning behavior, since the flanks of the first groove portion then collide when the circumferential groove comes into contact with the road. The water on the road then cannot pass through the first groove portion into the larger cross section of the inner second groove portion, which would immediately and significantly reduce aquaplaning. This is only the case when the first groove portion is at least almost completely or completely worn away. The inner, second groove portion then represents an open circumferential groove which, owing to its cross section, can absorb a large amount of water from the road, thereby reducing the risk of aquaplaning to a considerable extent.

The object of the invention is to provide circumferential grooves for a pneumatic vehicle tire, which further have the advantages of the previously known circumferential grooves, which have at least two groove portions following one another in the radial direction, and additionally have an improved cross-sectional profile in the circumferential direction that better avoids groove fractures. In particular, the increased risk of groove fractures in the shoulder region of tires is intended to be reduced by the improved structure of the circumferential grooves. Above all, the improved cross-sectional profile is also intended to reduce the risk of groove fractures if a pneumatic vehicle tire has already been in use for a long time. On the one hand, the sipes on the surface are then largely removed. Above all, however, the risk of groove fractures in this region is then greatly increased as a result of multiple, even rolling of the tire and the associated permanent alternation of compression and tension in the region of the groove base facing the shoulder. In addition, the shoulder region of the tire is particularly stressed when cornering due to the significant transfer of the lateral guidance forces.

The problem of groove fractures is increased particularly in utility vehicles, since the high dead weight of the vehicles, which can also be increased by the weight of a transported load depending on use, means that very high weight forces act on the tread of utility vehicle tires, in particular the profile blocks of the profile of the tread. The problem is particularly great with the steering axle tires of utility vehicles, which are always subjected to the same change in compression and tension. This is increased even more if the utility vehicles are used mainly or only for long-distance transport.

SUMMARY OF THE INVENTION

The object is achieved by pneumatic vehicle tires, in particular utility vehicle tires, according to the present disclosure.

A pneumatic vehicle tire of this type is a pneumatic vehicle tire, having a tread which has a profiling and which has at least one circumferential groove which runs in encircling fashion in the circumferential direction of the pneumatic vehicle tire, is formed to a profile depth PT and which, at least over at least part of the circumference of the pneumatic vehicle tire, is made up, in cross section perpendicularly to the circumferential direction, of at least two groove portions adjoining one another in a radial direction R of the pneumatic vehicle tire, and having a first groove portion which is symmetrical with respect to the radial direction R of the pneumatic vehicle tire and the width of which in the axial direction of the pneumatic vehicle tire is less than 3 mm and does not vary by more than 10%, preferably by more than 2% and particularly preferably by more than 0.5%, and having a radially inner second groove portion which is made wider in the axial direction of the pneumatic vehicle tire in comparison with the first groove portion, has the largest cross-sectional area of all the groove portions and the cross-sectional area of which is asymmetrical to the radial direction R, extends on both sides of the radial direction R and has an edge without corners in the bottom region of the circumferential groove.

In this case, the tread of the pneumatic vehicle tire thus has a profiling which has at least one, usually a plurality of, circumferential grooves running in encircling fashion in the circumferential direction of the pneumatic vehicle tire. At least one of said circumferential grooves is formed to a profile depth (PT) and has, at least over at least part of the circumference of the pneumatic vehicle tire, a cross section perpendicularly to the circumferential direction that is made up of at least two groove portions adjoining one another in a radial direction R of the pneumatic vehicle tire.

This circumferential groove then has the same profile depth over the entire circumference of the tire, with a tolerance of typically 0.10 to 0.15 mm, which is merely caused by the manufacturing. Only if tread wear indicators are arranged in the circumferential groove can the profile depth deviate by the height of the tread wear indicators at these points. For example, the height of a tread wear indicator may be 1.2 mm. As tread wear indicators, for example transverse webs are arranged in a circumferential groove at the groove base uniformly over the circumference of the tire.

If the at least one circumferential groove running in encircling fashion in the circumferential direction of the pneumatic vehicle tire and formed to a profile depth PT involves a plurality of circumferential grooves, they can have the same or different profile depths, which, however, as explained above, are the same over the tire circumference in the case of a circumferential groove.

The at least two adjoining groove portions lie directly one behind the other in a radial direction R of the pneumatic vehicle tire as parts of a cross section of a circumferential groove of the pneumatic vehicle tire. A pneumatic vehicle tire according to the invention can also have further circumferential grooves which do not have such groove portions or have only differently designed groove portions.

The first groove portion of the two groove portions has a width in the axial direction of the pneumatic vehicle tire of less than 3 mm. This width varies by no more than 10%, preferably no more than 2% and particularly preferably no more than 0.5%. In a preferred embodiment, the width of the first groove portion is even constant in the axial direction. Deviations can then be attributed solely to the limits of the manufacturing possibilities of the circumferential grooves in the pneumatic vehicle tire. The resulting tolerance in the width of the first groove portion is typically less than 0.2 mm, preferably less than 0.15 mm and particularly preferably less than 0.05 mm. This first groove portion is symmetrical to the radial direction R of the pneumatic vehicle tire. Owing to the symmetry of the first groove portion with respect to the radial direction R, it is therefore then precisely determined for the circumferential groove in which radial direction its at least two groove portions adjoin one another.

The small width of the first groove portion in the axial direction, which is less than 3 mm, ensures that the sides of the first groove portion touch when a cross section of the circumferential groove comes into contact with the road due to the vehicle weight, which compresses the rubber of the tread, as a result of which further radial deformation is prevented in this region of the circumferential groove. This considerably reduces the rolling resistance of the pneumatic vehicle tire. In addition, the contact pressure on the surface of the tread is reduced in this region by the groove flanks touching, which leads to a reduction in the tire abrasion. In order to reliably achieve the effect, a width of the first groove portion in the axial direction is typically selected to be from 0.5 mm to 2.8 mm, preferably from 0.75 mm to 2.25 mm and particularly preferably from 1.1 mm to 1.4 mm.

The second groove portion is arranged radially inward along the radial direction R with respect to the first groove portion. Compared to the first groove portion, it is widened in the axial direction A and has the largest cross-sectional area perpendicular to the circumferential direction of all the groove portions of the circumferential groove. In contrast to the first groove portion, the cross-sectional area of the second groove portion is asymmetrical to the radial direction R. It extends on both sides of the radial direction R belonging to the circumferential groove and has an edge without corners in the bottom region of the circumferential groove, which is formed by the second groove portion. This means that there is no point at the edge of the cross section in the bottom region of the circumferential groove where two straight sides abut or where the angle of inclination to the radial direction changes discontinuously. i.e. abruptly.

Owing to the asymmetry of the cross-sectional area perpendicular to the circumferential direction of the second groove portion to the radial direction R in one or more circumferential grooves of the pneumatic vehicle tire according to the invention, the risk of groove fractures in these circumferential grooves can be reduced, since, with different loads on the circumferential grooves on both sides of the circumferential groove in the axial direction A, the contour of the edge of the cross-sectional area perpendicular to the circumferential direction of the second groove portion is now configured correspondingly on both sides. The risk of groove fractures is also reduced in particular by the fact that the edge of the cross-sectional area perpendicular to the circumferential direction of the second groove portion has no corners at least in the bottom region, with the contour being configured differently on both sides of the radial direction R. This requirement for the contour of the edge of the cross-sectional area perpendicular to the circumferential direction avoids weak points for groove fractures due to the discontinuity of an edge in the material of the tread, a rubber compound.

In an advantageous development of the invention, it is provided that the edge of the cross-sectional area of the second groove portion in the bottom region of the circumferential groove only has rounded portions. In this case, the edge in the bottom region of the circumferential groove has rounded portions with different curvatures, which are described by a radius of curvature. In particular, the edge has rounded portions with a constant curvature or a constant radius of curvature over a certain length of the edge. In the region of constant curvature, the edge then corresponds to an arc of a circle with the associated constant radius of curvature. In this case, the arc of a circle can typically encompass an angular range of the circle of up to 90°. The angular range of the arc of a circle is often in the range from 30° to 75°, preferably between 45° and 60°. However, the angular range of the arc of a circle can also have only a relatively small value and thereby comprise less than 30° of the circle, and even can be less than 20° and 10°.

In another advantageous development of the invention, it is provided that the edge of the cross-sectional area of the second groove portion in the bottom region of the circumferential groove has only rounded portions and straight lines. In such an embodiment, too, the edge has rounded portions with different curvatures, which are described by a radius of curvature. In particular, the edge has rounded portions with a constant curvature or a constant radius of curvature over a certain length of the edge. The angular ranges of an arc of a circle provided by this means can have the same values as in the previously described development. In this embodiment, however, the edge of the cross-sectional area of the second groove portion perpendicular to the circumferential direction also has at least one straight line in the bottom region of the circumferential groove.

A straight line running in the axial direction A can be present in the bottom region of the circumferential groove. Their distance from the surface of the tread corresponds to the profile depth PT for an unused tire.

The edge of the second groove portion can also have a straight line on one or both of its sides of the circumferential groove.

In a further preferred embodiment, in the bottom region of the circumferential groove, the side of the circumferential groove has a curvature with the smallest radius of curvature, the curvature facing the center of the pneumatic vehicle tire. If the circumferential groove is not arranged axially in the center of the tread, the side of the circumferential groove that faces the center of the pneumatic vehicle tire is curved differently in the bottom region of the circumferential groove than the side of the circumferential groove that faces the outside of the pneumatic vehicle tire. In this case, the side of the circumferential groove which faces the center of the pneumatic vehicle tire has a greater curvature with a smaller radius of curvature. The correspondingly smaller curvature of the side of the circumferential groove that faces the outside of the pneumatic vehicle tire increases the transverse rigidity of this side and thus reduces the risk of a groove fracture on this side.

In this case, in the bottom region of the circumferential groove on the side of the circumferential groove which faces the center of the pneumatic vehicle tire, the smallest radius of curvature of the curvature is typically at least 20% smaller than the smallest radius of curvature of the curvature of the other side, preferably at least 35% smaller than the smallest radius of curvature of the curvature of the other side and particularly preferably at least 50% smaller than the smallest radius of curvature of the curvature of the other side.

Preferably, one of the circumferential grooves running in encircling fashion in the circumferential direction of the pneumatic vehicle tire and formed to a profile depth PT and having a cross section perpendicular to the circumferential direction at least in part of the circumference, which is made up of at least two groove portions that adjoin one another in a radial direction R of the pneumatic vehicle tire with the properties described above, is an outer groove of a pneumatic vehicle tire according to the invention.

In a further embodiment, the two outer grooves of a pneumatic vehicle tire according to the invention are circumferential grooves of this type.

In a further embodiment, a pneumatic vehicle tire according to the invention has only one such circumferential groove which forms one of the two outer grooves of the pneumatic vehicle tire.

In a further advantageous embodiment of a pneumatic vehicle tire according to the invention, the second groove portion of the cross section made up of at least two groove portions has a cross-sectional area perpendicularly to the circumferential direction, in which over at least 35% of the height of the second groove portion in the radial direction R, the cross-sectional area, starting from the bottom region of the circumferential groove, is asymmetrical to the radial direction R, preferably over at least 50% of the height of the second groove portion in the radial direction R, the cross-sectional area, starting from the bottom region of the circumferential groove, is asymmetrical to the radial direction R, and particularly preferably over at least 70% of the height of the second groove portion in the radial direction R, the cross-sectional area, starting from the bottom region of the circumferential groove, is asymmetrical to the radial direction R.

Owing to the symmetry of the first groove portion with respect to the radial direction R, it is precisely determined for the circumferential groove in which radial direction R its at least two groove portions adjoin one another. The height of the second groove portion in the radial direction R is defined as the maximum height of the cross-sectional area in the direction of the radial direction R and is given by the maximum distance between two points on the edge of the cross-sectional area, by which distance they are from one another only in the radial direction R. Their distance perpendicular to the radial direction is not taken into consideration here. The asymmetry of the cross-sectional area to the radial direction R is present over a certain portion of the height of the second groove portion in the radial direction R. Here, the asymmetrical region starts at the bottom region of the circumferential groove, which is also the bottom region of the second groove portion, and extends from this region over the certain portion of the height of the second groove portion in the radial direction R. The asymmetry of the second groove portion in its bottom region and a further portion of the cross section in the radial direction R is very advantageous for avoiding groove fractures. The greater the portion of the asymmetrical cross section, the more the circumferential groove can correspondingly take account of different loads caused by forces on its two sides in the axial direction A. This is generally all the more the case, the greater the difference between the smallest radii of curvature on both sides of the circumferential groove in the bottom region of the circumferential groove.

Typically, the second groove portion is asymmetrical to the radial direction R over a height of at least 3 mm, preferably over a height of 4 mm and particularly preferably a height of 5 mm in the radial direction R, starting from the deepest point of the circumferential groove.

In one embodiment of the pneumatic vehicle tire according to the invention, the cross-sectional area of the second groove portion between the radial direction R (i.e. an imaginary line running in the radial direction R, which is centrally axially located to axially bisect the width in the axial direction A of the first groove portion) and the side of the circumferential groove which faces the center of the pneumatic vehicle tire is between 10% smaller and 40% greater, preferably between 3% smaller and 30% greater and particularly preferably between 15% and 25% greater than the cross-sectional area of the second groove portion between the radial direction R (i.e. an imaginary line) and the side of the circumferential groove that faces the outside of the pneumatic vehicle tire. It has been shown that such an area ratio best takes account of the different loads on the sides of the circumferential groove, in particular if the edge of the second groove portion is designed according to the criteria described above.

In one embodiment of the pneumatic vehicle tire according to the invention, in the radially inner region of the second groove portion, which is asymmetrical to the radial direction R, the cross-sectional area of the second groove portion between the radial direction R and the side of the circumferential groove that faces the center of the pneumatic vehicle tire is 15% smaller to 45% greater, preferably 5% smaller to 35% greater, and particularly preferably 25% to 32% greater than the cross-sectional area of the second groove portion between the radial direction R and the side of the circumferential groove that faces the outside of the pneumatic vehicle tire.

Therefore, the radially inner region of the second groove portion, which is asymmetrical to the radial direction R and has these cross-sectional areas, starts at the bottom region of the circumferential groove and extends from this region over a corresponding distance of the second groove portion in the radial direction R.

In one embodiment of the pneumatic vehicle tire according to the invention, the edge of the cross-sectional area of the second groove portion has a straight line on both sides of the circumferential groove, which straight line converges inward toward the radial direction R, the straight line on the side of the circumferential groove that faces the center of the pneumatic vehicle tire having a smaller inclination with respect to the radial direction R than the straight line on the side of the circumferential groove that faces the outside of the pneumatic vehicle tire.

With the straight lines on the two sides of the circumferential groove, which straight lines converge inward toward the radial direction R, the distance from the radial direction R, which is defined by the symmetry of the first groove portion, decreases as the distance from the surface of the tread of the pneumatic vehicle tire increases.

Typically, the angle of inclination relative to the radial direction R of the straight lines on the side of the circumferential groove that faces the outside of the pneumatic vehicle tire is 8 times to 100 times, preferably 12 times to 30 times, and particularly preferably 17 to 20 times greater than the angle of inclination of the straight lines on the side of the circumferential groove that faces the center of the pneumatic vehicle tire. Typically, the angle of inclination of the straight lines on the side of the circumferential groove that faces the center of the pneumatic vehicle tire has a value of 0° to 15°, preferably a value of 4° to 11° and particularly preferably a value of 6° to 9°. Typically, the angle of inclination of the straight lines on the side of the circumferential groove that faces the outside of the pneumatic vehicle tire has a value of 10° to 45°, preferably a value of 15° to 35° and particularly preferably a value of 25° to 32°.

The greater inclination of the straight lines on the side of the circumferential groove that faces the outside of the pneumatic vehicle tire increases the transverse rigidity of this side and thereby reduces the risk of groove fracture on this side.

In one embodiment of the pneumatic vehicle tire according to the invention, the edge of the cross-sectional area of the second groove portion on the side of the circumferential groove that faces the outside of the pneumatic vehicle tire has a straight line with a length that is less than 40% of the height of the second groove portion in the radial direction R, preferably less than 20% of the height of the second groove portion in the radial direction R, and particularly preferably less than 10% of the height of the second groove portion in the radial direction R.

In a preferred embodiment of the pneumatic vehicle tire according to the invention, the edge of the cross-sectional area of the second groove portion has a straight line converging inward toward the radial direction only on the side of the circumferential groove that faces the center of the pneumatic vehicle tire.

A configuration of the side of the circumferential groove that faces the center of the pneumatic vehicle tire with a straight line, which preferably, as described above, has only a small angle of inclination with respect to the radial direction R, can be advantageous on this side, since it is not the transverse rigidity of the adjacent profile blocks of the profile that is in the foreground here, but rather the possibility of absorbing water when the road is wet owing to the shape of the second groove portion and thus of improving the drainage properties of the circumferential groove. Such a configuration therefore ensures both increased stability of the profile of the pneumatic vehicle tire and good wet behavior of the pneumatic vehicle tire, as a result of which in particular the risk of aquaplaning is appropriately reduced.

In one embodiment of the pneumatic vehicle tire according to the invention, the cross-sectional area of the second groove portion perpendicularly to the circumferential direction has a maximum width, perpendicularly to the radial direction R, which is 20% smaller to 50% greater, preferably 5% smaller to 35% greater and particularly preferably 10% to 17% greater than the maximum height of the cross-sectional area in the direction of the radial direction R. Here, the maximum width of the cross-sectional area of the second groove portion is defined as the maximum distance between two edge points on the edge of the cross-sectional area, by which distance they are from one another only in the axial direction A. In other words: the two edge points that define the maximum width of the second groove distance are the two points on both sides of the second groove portion, which points are each at the greatest distance from the radial direction R. The maximum width of the second groove distance then results as the sum of the distances between the two points from the radial direction R that are at the greatest distance from the radial direction R. It is usually the case that the two points are not at the same distance from the surface of the tread of the pneumatic vehicle tire, i.e. are not present at the same profile depth.

The point at the greatest distance from the radial direction R on the side that faces the outside of the pneumatic vehicle tire is preferably at a greater profile depth than the point at the greatest distance from the radial direction R on the side that faces the center of the pneumatic vehicle tire. The difference here in the profile depth of both points is typically 0.5% to 15% of the maximum height of the cross-sectional area of the second groove portion in the direction of the radial direction R, preferably 1% to 6% of the maximum height of the cross-sectional area of the second groove portion in the direction of the radial direction R and particularly preferably 2% to 3% of the maximum height of the cross-sectional area of the second groove portion in the direction of the radial direction R. The distance of the edge point of the cross-sectional area of the second groove portion perpendicularly to the circumferential direction at the greatest distance from the radial direction R on the side that faces the outside of the pneumatic vehicle tire to the lowest point of the circumferential groove in the radial direction R is typically 30% to 80% of the maximum height of the cross-sectional area of the second groove portion in the direction of the radial direction R, preferably 50% to 75% of the maximum height of the cross-sectional area of the second groove portion in the direction of the radial direction R and particularly preferably 55% to 65% of the maximum height of the cross-sectional area of the second groove portion in the direction of the radial direction R. The distance of the edge point of the cross-sectional area of the second groove portion perpendicular to the circumferential direction at the greatest distance from the radial direction R on the side that faces the center of the pneumatic vehicle tire to the deepest point of the circumferential groove in the radial direction R is typically 50% to 80% of the maximum height of the cross-sectional area of the second groove portion in the direction of the radial direction R, preferably 55% to 75% of the maximum height of the cross-sectional area of the second groove portion in the direction of the radial direction R and particularly preferably 60% to 70% of the maximum height of the cross-sectional area of the second groove portion in the direction of the radial direction R.

The distance from the radial direction R of the edge point of the cross-sectional area of the second groove portion perpendicularly to the circumferential direction at the greatest distance from the radial direction R on the side that faces the outside of the pneumatic vehicle tire is preferably greater than the distance from the radial direction R of the edge point of the cross-sectional area of the second groove portion perpendicularly to the circumferential direction at the greatest distance from the radial direction R on the side that faces the center of the pneumatic vehicle tire. The distance from the radial direction R of the edge point at the greatest distance from the radial direction R on the side that faces the outside of the pneumatic vehicle tire is typically 5% to 35% greater, preferably 8% to 25% greater and particularly preferably 12% to 18% greater than the distance from the radial direction R of the edge point at the greatest distance from the radial direction R on the side that faces the center of the pneumatic vehicle tire.

The aforementioned positioning of the edge points at the greatest distance from the radial direction R on the two sides of the second groove portion achieves good transverse rigidity of the profile of the tread of the pneumatic vehicle tire on the side of the circumferential groove that faces the outside of the pneumatic vehicle tire, as well as good wet behavior of the pneumatic vehicle tire.

In one embodiment of the pneumatic vehicle tire according to the invention, in at least one of the one or more circumferential grooves running in encircling fashion in the circumferential direction of the pneumatic vehicle tire, the cross section perpendicularly to the circumferential direction in the at least one part of the circumference of the pneumatic vehicle tire, starting at the outer surface of the tread, is made up of only three groove portions adjoining one another in a radial direction R of the pneumatic vehicle tire, a third outer groove portion being made wider outward and being symmetrical to the radial direction R of the pneumatic vehicle tire and the first groove portion narrowing in relation to the third groove portion in the axial direction A.

This third groove portion adjoins the first groove portion outward in the radial direction and ends on the surface of the tread of the pneumatic vehicle tire. It is made wider outward, i.e. toward the outer surface of the tread, and, in the same way as the first groove portion, is symmetrical to the radial direction R of the pneumatic vehicle tire. The first groove portion is narrowed compared to the third groove portion.

Preferably, the cross section of the outer third groove portion is made wider uniformly outward perpendicularly to the circumferential direction. As a result, the cross section of the outer third groove portion has the shape of an isosceles and therefore symmetrical trapezium.

Typically, the third groove portion in a new pneumatic vehicle tire first of all has, on the surface of the tread, a width in the axial direction A of 2.5 mm to 5.0 mm, preferably a width of 3.5 mm to 4.6 mm and particularly preferably a width of 3.75 mm to 4.25 mm. In the radial direction R in the direction of the wheel axle, the third groove portion then typically tapers to a width in the axial direction A of 0.8 mm to 2.5 mm, preferably a width of 1.0 mm to 1.7 mm and particularly preferably to a width of 1.1 mm to 1.4 mm.

Typically, the two sides of the cross section of the third groove portion perpendicularly to the circumferential direction, if the third groove portion is made wider uniformly outward, have an angle of inclination of 25° to 45°, preferably 30° to 40°, and particularly preferably 33° to 37° in relation to the radial direction R. Owing to the inclination of the side walls, the first groove portion is able to absorb water in the wet and thus to improve the wet behavior of the pneumatic vehicle tire.

In one embodiment of the pneumatic vehicle tires, all of the one or more circumferential grooves running in encircling fashion in the circumferential direction of the pneumatic vehicle tire have a third outer groove portion with the aforementioned properties, and therefore, in the parts of the circumference of the pneumatic vehicle tire in which the cross section is made up of the at least two groove portions, the cross section of the circumferential grooves perpendicularly to the circumferential direction is made up only of the three groove portions adjoining one another in the radial direction R of the pneumatic vehicle tire, namely the first, the second and the third groove portions with the aforementioned properties.

In one embodiment of the pneumatic vehicle tire according to the invention, the at least one circumferential groove which runs in encircling fashion in the circumferential direction of the pneumatic vehicle tire and is formed to a profile depth PT has, over the entire circumference of the pneumatic vehicle tire, the same cross section perpendicularly to the circumferential direction. This is made up of at least two groove portions adjoining one another in the radial direction R of the pneumatic vehicle tire, the first groove portion and the second inner groove portion. The second inner groove portion, preferably with the described properties, then has good lateral stability against groove fractures and good wet behavior over the entire circumference of the tire.

In one embodiment of the pneumatic vehicle tire according to the invention, the cross section perpendicularly to the circumferential direction of the at least one circumferential groove of the pneumatic vehicle tire, which cross section is made up, at least over at least part of the circumference of the pneumatic vehicle tire perpendicularly to the circumferential direction, of the at least two groove portions adjoining one another in a radial direction R of the pneumatic vehicle tire, the first groove portion and the second inner groove portion, has the same position in the axial direction of the pneumatic vehicle tire over the part of the circumference.

In one embodiment of the pneumatic vehicle tire according to the invention, the cross section perpendicularly to the circumferential direction of the at least one circumferential groove of the pneumatic vehicle tire, which cross section is made up, at least over at least part of the circumference of the pneumatic vehicle tire perpendicularly to the circumferential direction, of the at least two groove portions adjoining one another in a radial direction R of the pneumatic vehicle tire, the first groove portion and the second inner groove portion, changes its axial position over the circumference of the pneumatic vehicle tire. The axial position of the cross section over the circumference of the pneumatic vehicle tire can follow a wavy line or a zigzag line here. An embodiment of the pneumatic vehicle tire according to the invention can also have circumferential grooves, in which the position of the cross section in the axial direction on the one hand remains the same and on the other hand changes over various parts of the circumference of the pneumatic vehicle tire. Similarly, the position of the cross section in the axial direction can change differently in different parts of the circumference of the pneumatic vehicle tire, e.g. by the axial position of the cross section over the circumference of the pneumatic vehicle tire following a wavy line on the one hand and a zigzag line on the other hand.

A further embodiment of the pneumatic vehicle tire according to the invention has at least one circumferential groove which runs in encircling fashion in the circumferential direction of the pneumatic vehicle tire and is formed to a profile depth PT over the circumference of the pneumatic vehicle tire, and is made up, in at least part of the circumference of the pneumatic vehicle tire, in the cross section perpendicularly to the circumferential direction, of the at least two groove portions adjoining one another in a radial direction R of the pneumatic vehicle tire, the first groove portion and the second inner groove portion of the pneumatic vehicle tire, and has a U profile in at least part of the circumference of the pneumatic vehicle tire, as a cross section perpendicular to the circumferential direction. Here, the U profile is preferably formed asymmetrically, e.g. with a cross section which is known from DE 10 2005 042 903 A1. In the case of the at least one circumferential groove, parts over the circumference with a cross section perpendicular to the circumferential direction, which is made up of the three groove portions adjoining one another in the radial direction R of the pneumatic vehicle tire, preferably alternate with parts which have a U profile, as a cross section perpendicular to the circumferential direction. In this case, both parts preferably have the same length in the circumferential direction. Between the two parts with the different cross sections perpendicular to the circumferential direction, there are still preferably transition regions over a section of the circumference that is significantly smaller than the length of the parts in the circumferential direction. In this region, the structure of the cross section changes from one shape to the other.

In the embodiment with an asymmetrical U profile, because of the change in the cross section of the circumferential grooves over the circumference there are regions over the circumference that combine good wet behavior with a low rolling resistance and a reduced risk of groove fractures because of the at least two different groove portions and regions in which the wet behavior is particularly good because of the open profile and the transverse rigidity owing to an asymmetrical U profile. In this case, when a road is wet, water can pass from the asymmetrical U profile into the second inner groove portion of the multi-part cross-sectional area of the other part, which further reduces the risk of aquaplaning in this embodiment.

In a particularly preferred embodiment of the pneumatic vehicle tire according to the invention, the two circumferential grooves of the pneumatic vehicle tire that are on the outside in the tire profile in the axial direction A have the alternation in the two cross-sectional shapes over the entire circumference. The parts in the two circumferential grooves are preferably arranged relative to one another here such that if, in one part of the circumference, one of the two circumferential grooves has the at least two-part cross-sectional area perpendicular to the circumferential direction, the other circumferential groove has a U profile as a cross section perpendicular to the circumferential direction. As a result, wet behavior, such as aquaplaning capability, optimal rolling resistance and optimal transverse rigidity of the profile are uniformly distributed over the circumference. With increasing abrasion of the tread of the pneumatic vehicle tire, the parts of the circumference that have a cross section with the at least two groove portions also contribute more to the aquaplaning behavior through the second inner groove portion and thus compensate for the fact that in other parts of the circumference with decreasing groove depth less water can be absorbed from the road. Therefore, the profile change over the circumference, in particular in combination with the different profile of the two outer grooves when they come into contact with the road, ensures that a pneumatic vehicle tire according to the invention has good aquaplaning behavior over a long service life.

In addition, in each embodiment of the pneumatic vehicle tires according to the invention, a structure that faces radially outward can be arranged in the second inner groove portion in the bottom region of the circumferential groove, which makes it difficult or impossible for small foreign bodies to penetrate into the circumferential groove.

In a preferred embodiment of the pneumatic vehicle tires according to the invention, the average width of the first groove portion in the axial direction A of the pneumatic vehicle tire, with an elasticity of the tread with a modulus of elasticity at 60° C. of 6.0 Mpa to 7.0 Mpa, is 0.7 mm to 2.5 mm, preferably 0.9 to 2.0 mm and particularly preferably 1.0 to 1.5 mm. The width of the first groove portion in the axial direction A is preferably constant here in the radial direction R.

In another preferred embodiment of the pneumatic vehicle tires according to the invention, the average width of the first groove portion in the axial direction A of the pneumatic vehicle tire, with an elasticity of the tread with a modulus of elasticity at 60° C. of 7.0 Mpa to 8.0 Mpa, is 0.55 mm to 2 mm, preferably 0.8 to 1.5 mm and particularly preferably 0.9 to 1.2 mm. The width of the first groove portion in the axial direction A is preferably constant here in the radial direction R.

BRIEF DESCRIPTION OF THE DRAWINGS

The invention will be explained in more detail by way of a number of exemplary embodiments, in which.

DETAILED DESCRIPTION OF THE INVENTION

Figure 1:
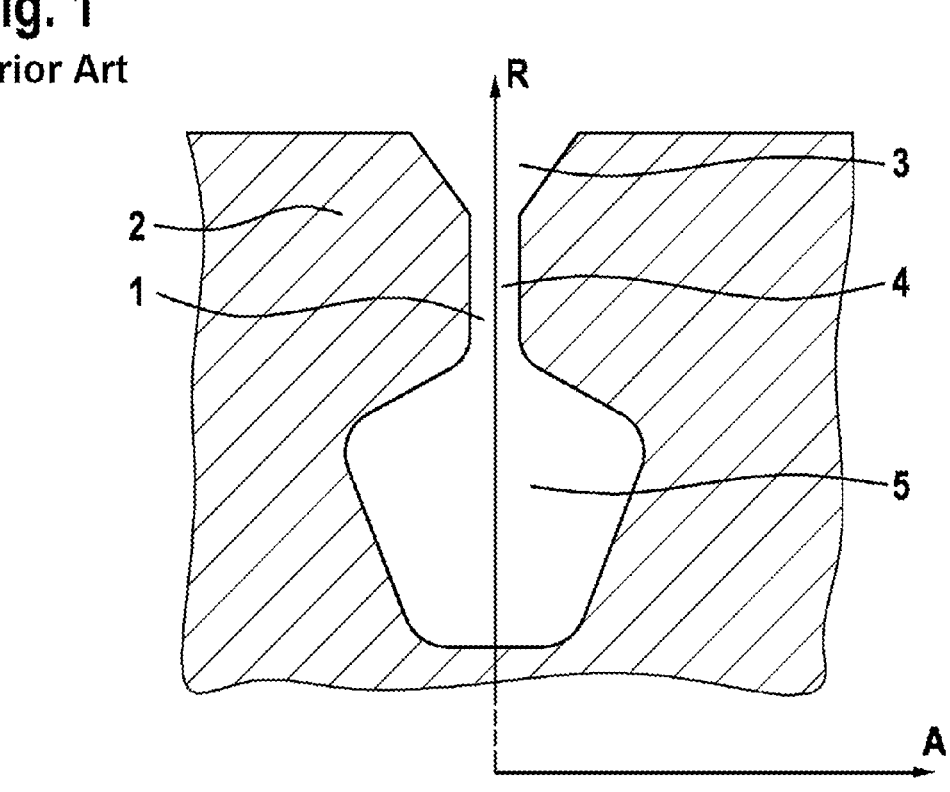
FIG. 1: shows a cross section of a circumferential groove according to the prior art with three groove portions
Figure 2:
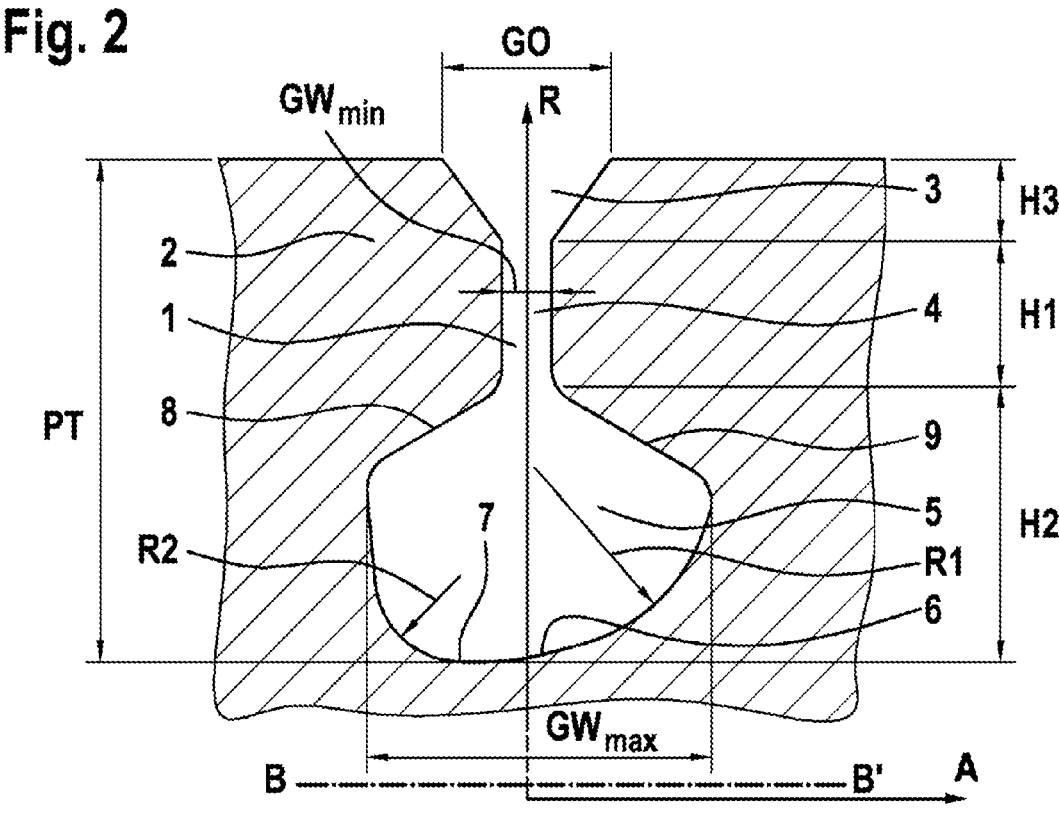
FIG. 2: shows a first embodiment of a circumferential groove according to the invention with three groove portions

FIG. 2 shows a circumferential groove 1 of a first embodiment of a pneumatic vehicle tire according to the invention.

The cross section of the circumferential groove 1 perpendicularly to the circumferential direction of the pneumatic vehicle tire in the tread 2 of the pneumatic vehicle tire is shown. The circumferential groove 1 is divided here into three groove portions, a first groove portion 4, a second inner groove portion 5 and an outer third groove portion 3. These groove portions are arranged in a radial direction R of the pneumatic vehicle tire. In this case, both the first groove portion 4 and the third groove portion 3 are arranged symmetrically with respect to the radial direction R (indicated by the directional arrow R in FIG. 2). The third groove portion 3 is made wider outward toward the surface of the tread 2. The cross section of the outer third groove portion 3 of the circumferential groove 1 shown in FIG. 2 is made wider uniformly outward in the radial direction R. Correspondingly, the cross section of the third groove portion 3 perpendicularly to the circumferential direction has the shape of an isosceles and therefore symmetrical trapezium. In the new state of the pneumatic vehicle tire, in the embodiment, the third groove portion 3 on the surface of the tread 2 of the pneumatic vehicle tire has a width GO in the axial direction A of 4 mm and a width $GW_{min}$ of 1.2 mm at its innermost point. Said third groove portion 3 is adjoined in the radial direction R by the first groove portion 4. In the exemplary embodiment shown, the latter has a constant width of 1.2 mm in the axial direction A over its extent in the radial direction R. The first groove portion 4 is thus narrowed compared to the third groove portion 3. Furthermore, the circumferential groove has a second groove portion 5. In this second groove portion 5, the distance from the circumferential groove 1 to the center of the tire or the hub of the wheel that carries the pneumatic vehicle tire is smallest. Accordingly, the second inner groove portion 5 has, in its bottom region, the bottom region of the circumferential groove 6, a deepest point 7 of the circumferential groove, which is at the greatest distance from the surface of the tread 2 of the pneumatic vehicle tire. In the new state of the pneumatic vehicle tire, this distance is the profile depth PT of the pneumatic vehicle tire. The inner second groove portion 5 adjoining the first groove portion 4 has the largest cross-sectional area of the three groove portions of the circumferential groove. This cross-sectional area is asymmetrical to the radial direction. It extends on both sides of the radial direction and has an edge without corners.

In the plane perpendicular to the circumferential direction of the pneumatic vehicle tire, the circumferential groove 1 has two sides. The side 8 of the circumferential groove faces the center of the pneumatic vehicle tire. The side 9 of the circumferential groove faces the outside of the pneumatic vehicle tire. Both sides of the circumferential groove 1 each have a curvature in the bottom region 6 of the circumferential groove 1, which bottom region is part of the second groove portion 5. The radius of curvature of both sides differs. The radius of curvature R2 of the curvature of the side 8 of the circumferential groove that faces the center of the pneumatic vehicle tire is smaller than the radius of curvature R1 of the side 9 of the circumferential groove that faces the outside of the vehicle tire. The radius of curvature R2 of the side 8 of the circumferential groove that faces the vehicle center of the pneumatic vehicle tire is 2 mm in the exemplary embodiment. The radius of curvature R1 of the side 9 of the circumferential groove that faces the outside of the pneumatic vehicle tire is 4 mm. Thus, in the exemplary embodiment, the radius of curvature R2 of the side 8 that faces the center of the vehicle is 50% smaller than the radius of curvature of the other side 9. In the exemplary embodiment, the cross-sectional area of the second groove portion

5 is not asymmetrical over its entire height H2 in the radial direction R. In the exemplary embodiment shown in FIG. 2, the third groove portion 3 has a height H3 of 2 mm in the direction of the radial direction R. In the direction of the radial direction R, the first groove portion 4 has a height H1 of 3.5 mm. The second groove portion 5 has a height H2 of 6.5 mm in the direction R in the direction of the radial direction. Of this height, 73.8% of the height in the inner region of the second groove portion 5 is asymmetrical. The asymmetrical region of the second groove portion 5 therefore has a height of 4.8 mm in the radial direction R (i.e. an imaginary line running in the radial direction R, which is centrally axially located to axially bisect the width in the axial direction A of the first groove portion). The cross-sectional area of the second groove portion 5 between the radial direction R and the side 8 of the circumferential groove 1 that faces the center of the pneumatic vehicle tire is approx . . . 1.1% smaller in the exemplary embodiment shown than the cross-sectional area of the second groove portion 5 between the radial direction R (i.e. the imaginary line) and the side 9 of the circumferential groove 1 that faces the outside of the pneumatic vehicle tire. Here, the percentage is based on the area between the radial direction R (i.e. the imaginary line) and the side of the circumferential groove that faces the outside of the pneumatic vehicle tire. Looking only at the asymmetrical region of the cross section of the second groove portion 5, the area between the radial direction R (i.e. the imaginary line) and the side 8 of the circumferential groove 1 that faces the center of the pneumatic vehicle tire is even smaller by approx. 1.4% than the cross-sectional area of the second groove portion between the radial direction R (i.e. the imaginary line) and the side 9 of the circumferential groove 1 that faces the outside of the pneumatic vehicle tire. The ratio of the areas between the individual sides 8, 9 of the circumferential groove 1 and the radial direction R (i.e. the imaginary line), together with the geometry of the cross-sectional area, is essential for the optimum behavior of the circumferential groove 1 both in terms of wet behavior and the transverse rigidity of the profile of the tread of the pneumatic vehicle tire. Area ratios between said areas that are typically used have already been described previously. In the first exemplary embodiment of a circumferential groove 1 of a pneumatic vehicle tire according to the invention that is shown in FIG. 2, it should be emphasized that the edge of the cross-sectional area of the second groove portion 5 has only a straight line on the side 8 that faces the center of the vehicle tire and does not have any corners whatsoever or other straight lines. Correspondingly, the entire edge of the cross-sectional area of the second groove portion 5—apart from the straight line—only has curvatures. This leads to an increased rigidity of the groove profile, in particular on the side of the circumferential groove 1 that faces the outside of the vehicle tire, i.e. the side 9.

In the first embodiment, the straight line on the side 8 that faces the center of the vehicle tire has an angle with respect to the radial direction R of 8.1°. The distance between the straight line and the radial direction R (i.e. the imaginary line) is reduced here as the distance from the surface of the tread 2 increases. Typically, in a pneumatic vehicle tire according to the invention, which has a straight line on the side 8 that faces the center of the vehicle tire, the angle relative to the radial direction R is 0° to 15°, preferably 4° to 11° and particularly preferably 6° to 9°.

On both sides 8, 9 of the second groove portion 5 there is in each case a point on the edge of the cross section which is at the greatest distance from the radial direction R (i.e. the imaginary line). The edge point at the maximum distance from the radial direction R (i.e. the imaginary line), which edge point is located on the side 8 of the circumferential groove 1 that faces the center of the pneumatic vehicle tire, is at a distance from the radial direction R (i.e. the imaginary line) in the axial direction A of 3.9 mm. In addition, this point of the maximum distance is at a distance in the radial direction R of 4 mm from the deepest point 7 of the second groove portion 5. The point of the edge of the cross-sectional area of the second groove portion 5, which is on the side 9 of the circumferential groove 1 that faces the outside of the pneumatic vehicle tire, is at a distance from the radial direction R (i.e. the imaginary line) of 4.6 mm. In addition, this point is at a distance in the radial direction R (i.e. the imaginary line) of 3.8 mm from the deepest point 7 of the circumferential groove 1. A maximum width Gwmax of the cross-sectional area of the third groove portion 5 is also defined by the two points of the maximum distance on both sides 8, 9 of the circumferential groove. In the exemplary embodiment shown, the maximum width Gwmax of the second groove portion 5 is 8.5 mm. Typically, in a pneumatic vehicle tire according to the invention, the maximum width Gwmax of the second groove portion 5 is 4 mm to 10 mm, preferably 6 mm to 9 mm and particularly preferably 7 mm to 8 mm. The two points of the maximum distance GWmax of the cross-sectional area of the second groove portion 5 perpendicularly to the circumferential direction have been selected in such a way that the circumferential groove 1 has both very good wet properties and great transverse rigidity of the two sides 8, 9 of the circumferential groove, as a result of which groove fractures of the circumferential groove are avoided. Overall, the cross-sectional profile of the second groove portion 5 of the circumferential grooves 1 of the inventive pneumatic vehicle tire is selected such that a circumferential groove 1 has very good wet properties, e.g. with regard to aquaplaning and good strength against groove fractures, because of the cross-sectional area of the second groove portion 5. The invention is distinguished precisely by this compromise in the properties.

A ratio which very readily describes this property is the ratio of the maximum width Gwmax of the cross-sectional area of the second groove portion 5 to the maximum height H2 of the cross-sectional area in the direction of the radial direction R. In the exemplary embodiment shown in FIG. 2, the maximum width Gwmax perpendicular to the radial direction R of the cross-sectional area is 30.7% greater than the maximum height H2 of the cross-sectional area in the direction of the radial direction R. Furthermore, in the exemplary embodiment, the distance from the radial direction R (i.e. the imaginary line) of the edge point of the cross-sectional area of the second groove portion 5 perpendicular to the circumferential direction with the greatest distance from the radial direction R (i.e. the imaginary line) on the side 9 that faces the outside of the pneumatic vehicle tire is greater than the distance of the edge point on the other side 8 from the radial direction R (i.e. the imaginary line), which edge point is at the greatest distance from the radial direction R (i.e. the imaginary line). The distance of the edge point on the side 9 that faces the outside of the pneumatic vehicle tire is 17.9% greater in the exemplary embodiment than the corresponding distance of the edge point from the radial direction R (i.e. the imaginary line), which edge point is at the maximum distance on the side 8 that faces the center of the pneumatic vehicle tire. Typically, in a pneumatic vehicle tire according to the invention, the distance of the edge point at the maximum distance from the radial direction R (i.e. the imaginary line) on the side 9 that faces the outside of the pneumatic vehicle tire is 5% to 35% greater, preferably 8% to 25% greater and particularly preferably 12% to 18% greater than the side 8 that faces the center of the pneumatic vehicle tire.

The distance between the edge point of the cross-sectional area of the second groove portion 5 perpendicular to the circumferential direction at the greatest distance from the radial direction R (i.e. the imaginary line) on the side 9 that faces the outside of the pneumatic vehicle tire and the deepest point 7 of the circumferential groove is 3.8 mm in the radial direction at a maximum height H2 of the cross-sectional area of the second groove portion of 6.5 mm. Accordingly, the distance from this edge point to the deepest point of the circumferential groove In the radial direction R is 58.4% of the maximum height H2 of the cross-sectional area of the second groove portion 5. Typically, the distance between the edge point of the cross-sectional area of the second groove portion 5 perpendicular to the circumferential direction at the greatest distance from the radial direction R (i.e. the imaginary line) on the side 9 that faces the outside of the pneumatic vehicle tire and the deepest point 7 of the circumferential groove in the radial direction R is between 30% and 80% of the maximum height H2 of the cross-sectional area of the second groove portion 5, preferably between 50% and 75% of the maximum height H2 of the cross-sectional area of the second groove portion 5 and particularly preferably between 55% and 65% of the maximum height H2 of the cross-sectional area of the second groove portion 5. This positioning of the outermost edge point of the side 9 of the circumferential groove that faces the outside of the pneumatic vehicle tire increases the transverse rigidity of this side of the profile of the tread 2.

The distance between the edge point of the cross-sectional area of the second groove portion 5 perpendicular to the circumferential direction at the greatest distance from the radial direction R (i.e. the imaginary line) on the side 8 that is free toward the center of the pneumatic vehicle tire and the deepest point 7 of the circumferential groove 1 is 4 mm in the radial direction R in the exemplary embodiment. Accordingly, the distance between this edge point and the deepest point 7 of the circumferential groove 1 is 61.5% of the maximum height H2 of the cross-sectional area of the second groove portion 5 in the direction of the radial direction R.

Typically, the distance between the edge point of the cross-sectional area of the second groove portion 5 perpendicular to the circumferential direction at the greatest distance from the radial direction R (i.e. the imaginary line) on the side 8 that faces the center of the pneumatic vehicle tire and the deepest point 7 of the circumferential groove is between 50% and 80% of the maximum height H2 of the cross-sectional area of the second groove portion 5 in the radial direction R, preferably between 55% and 75% of the maximum height H2 of the cross-sectional area of the second groove portion 5 and particularly preferably between 60% and 70% of the maximum height H2 of the cross-sectional area of the second groove portion 5. This positioning of the outermost edge point of the side 8 of the circumferential groove that faces the center of the pneumatic vehicle tire increases the water absorption capacity of the second groove portion 5, as a result of which the contribution of the circumferential groove 1 to the good wet behavior of the pneumatic vehicle tire according to the invention is improved.

The bottom region 6 of the circumferential groove 1 typically has the two radii of curvature R1 and R2, as shown in the exemplary embodiment. In the bottom region 6 of the circumferential groove 1 these are in each case the smallest radii of curvature of both sides 8 and 9 of the circumferential groove 1. Here, the smallest radius of curvature R1 of the side 9 of the circumferential groove 2 in the bottom region 6 that faces the outside of the pneumatic vehicle tire is greater than the smallest radius of curvature R2 of the side 8 in the bottom region 6 that faces the center of the pneumatic vehicle tire. In the exemplary embodiment of FIG. 2, the radius of curvature R1 is 4 mm and the radius of curvature R2 is 2 mm. Correspondingly, the radius of curvature R2, which is located in the bottom region of the side 8 of the circumferential groove 2 that faces the center of the pneumatic vehicle tire is 50% smaller than the radius of curvature R1 of the other side 9.

Typically, the smallest radius of curvature R1 of the side 9 in the bottom region 6 of the circumferential groove 1 in a pneumatic vehicle tire according to the invention has a value between 1.5 mm and 5.0 mm, preferably between 2.0 mm and 4.2 mm and particularly preferably between 3.5 and 4.0 mm. In a pneumatic vehicle tire according to the invention, the smallest radius of curvature R2 of the side 8 in the bottom region 6 of the circumferential groove 1 typically has a value between 0.7 mm and 2.5 mm, preferably between 1.0 mm and 2.2 mm and particularly preferably between 1.5 and 2.0 mm.

In the embodiment shown in FIG. 2, the cross section of the outer third groove portion 3 of the circumferential groove 1 shown is made wider uniformly outward in the axial direction A. Both sides of the third groove portion 3 therefore form straight lines which are at an angle to the radial direction R of 35° in the exemplary embodiment. The width GO of the first groove portion 3 tapers here from the surface of the tread 2 of the pneumatic vehicle tire, in the new state, from 4 mm to a width in the axial direction of 1.2 mm (Gwmin). The material of the tread 2 of the pneumatic vehicle tire, in which the circumferential groove shown is arranged, is usually a rubber compound. The material typically has a modulus of elasticity at 60° C., in the range of 11 Mpa, preferably a modulus of elasticity in the range of 4.0 to 9.0 Mpa and particularly preferably a modulus of elasticity in the range of 5.5 to 8.0 Mpa. In the exemplary embodiment shown, a modulus of elasticity of 6.5 Mpa is used. The modulus of elasticity is determined according to DIN EN 527. Furthermore, the tread of a pneumatic vehicle tire according to the invention has a loss factor tan δ, which is usually in the range from 0.03 to 0.25 at 60° C., preferably in the range from 0.05 to 0.2 at 60° C., and particularly preferably in the range from 0.75 to 0.1 at 60° C. In the exemplary embodiment shown, the loss factor tan δ is 0.085. The loss factor of the material of the tread 2 is determined according to DIN 52 513 and describes the hysteresis behavior of the viscoelastic material of the tread 2.

Figure 3:
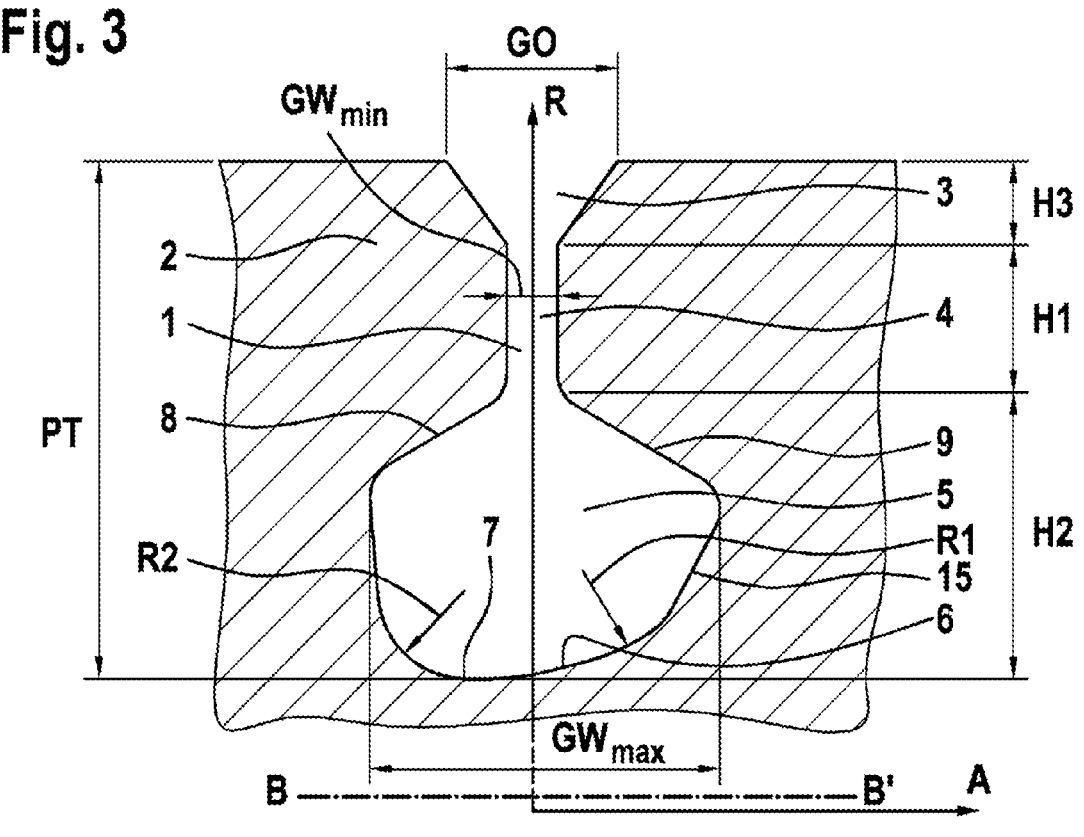
FIG. 3: shows a second embodiment of a circumferential groove according to the invention with three groove portions

FIG. 3 shows a circumferential groove 1 of a second embodiment of a pneumatic vehicle tire according to the invention. Identical and corresponding components are identified by the same reference signs as in the first embodiment shown in FIG. 2.

As in FIG. 2, the cross section of the circumferential groove 1 is shown perpendicularly to the circumferential direction of the pneumatic vehicle tire in the tread 2 of the pneumatic vehicle tire. Here, the circumferential groove 1 is divided into three groove portions, a first groove portion 4 and a second inner groove portion 5 and an outer third groove portion 3. These groove portions are arranged in a radial direction R of the pneumatic vehicle tire.

The first groove portion 4 and the third groove portion 3 are unchanged from the first embodiment. Therefore, both the first groove portion 4 and the third groove portion 3 are arranged symmetrically with respect to the radial direction R (shown by the directional arrow R in FIG. 3). Further details on these groove portions can be found in the first exemplary embodiment shown in FIG. 2.

Furthermore, the circumferential groove 1 shown in FIG. 3 has a second groove portion 5 which is configured differently than in the first exemplary embodiment shown in FIG. 2. In this second groove portion 5, too, the distance from the circumferential groove 1 to the center of the tire or the hub of the wheel that carries the pneumatic vehicle tire 1 is smallest. Accordingly, the second inner groove portion 5 has, in its bottom region, the bottom region 6 of the circumferential groove 1, a deepest point 7 of the circumferential groove, which is at the greatest distance from the surface of the tread of the pneumatic vehicle tire. In the new state of the pneumatic vehicle tire, this distance is the profile depth PT of the pneumatic vehicle tire. The second inner groove portion 5 adjoining the first groove portion has the largest cross-sectional area of the three groove portions of the circumferential groove. This cross-sectional area is asymmetrical to the radial direction. It extends on both sides of the radial direction and has an edge without corners.

In the plane perpendicular to the circumferential direction of the pneumatic vehicle tire, the circumferential groove 1 has two sides. The side 8 of the circumferential groove faces the center of the pneumatic vehicle tire. The side 9 of the circumferential groove faces the outside of the pneumatic vehicle tire. As in the first exemplary embodiment shown in FIG. 2, both sides of the circumferential groove each have a curvature in the bottom region 6 of the circumferential groove 1, which bottom region is part of the second groove portion 5. The radius of curvature of both sides differs. The radius of the curvature R2 of the side 8 of the circumferential groove that faces the center of the pneumatic vehicle tire is smaller than the radius of curvature R1 of the side 9 of the circumferential groove that faces the outside of the vehicle tire. The radius of curvature R2 of the side 8 of the circumferential groove that faces the vehicle center of the pneumatic vehicle tire is 2 mm in the exemplary embodiment. The radius of curvature R1 of the side 9 of the circumferential groove that faces the outside of the pneumatic vehicle tire is 4 mm. Thus, in the exemplary embodiment, the radius of curvature R2 of the side 8 that faces the center of the vehicle is 50% smaller than the radius of curvature R1 of the other side 9. In the exemplary embodiment, the cross-sectional area of the second groove portion 5 is not asymmetrical over its entire height in the radial direction R.

The second groove portion 5 has a height H2 of 6.5 mm in the direction R in the direction of the radial direction. Of this height, 78.7% of the height in the inner region of the third groove portion 5 is asymmetrical. The asymmetrical region of the third groove portion 5 therefore has a height of 5.12 mm in the radial direction R.

Compared to the first exemplary embodiment of a circumferential groove 1 of a pneumatic vehicle tire according to the invention that is shown in FIG. 2, the edge of the cross-sectional area of the third groove portion 5 in the second exemplary embodiment shown in FIG. 3 has a straight line on both sides 8 and 9 and no corners whatsoever or other straight lines. Correspondingly, the entire edge of the cross-sectional area of the third groove portion 5 has curvatures-apart from the two straight lines.

The straight line 15 on the side 9 of the circumferential groove 1 that faces the outside of the vehicle tire is designed in such a way that it contributes to increased rigidity of the groove profile, in particular on the side 9.

The straight line 15 is inclined by 33.3° in relation to the radial direction R and converges toward the radial direction R as the depth of the circumferential groove increases. It extends here in the radial direction R over 1.95 mm, which corresponds to 30.0% of the maximum height H2 of the cross-sectional area of the second groove portion 5.

On both sides 8, 9 of the second groove portion 5 there is in each case a point on the edge of the cross section which is at the greatest distance from the radial direction R. The edge point at the maximum distance from the radial direction R, which edge point is located on the side 8 of the circumferential groove 1 that faces the center of the pneumatic vehicle tire, is at a distance from the radial direction R in the axial direction A of 4 mm. The point of the edge of the cross-sectional area of the second groove portion 5, which is on the side 9 of the circumferential groove 1 that faces the outside of the pneumatic vehicle tire, is at a distance from the radial direction R of 4.27 mm. A maximum width Gwmax of the cross-sectional area of the second groove portion 5 in the axial direction A is also defined by the two points of the maximum distance on both sides 8, 9 of the circumferential groove. In the exemplary embodiment shown, the maximum width Gwmax of the second groove portion 5 is 8.27 mm.

The straight line 15 of the side 9 of the circumferential groove 1 that faces the outside of the pneumatic vehicle tire begins on the side 9, as viewed from the surface of the tread 2 of the pneumatic vehicle tire, almost below the point on the side 9 that is at the greatest distance from the radial direction R. Compared to this point, the straight line is aligned inward toward the center of the tire and reduces the width of the second groove portion 5 by means of its inclination with respect to the radial direction R. Compared to the deepest point 7 of the circumferential groove, the distance of the straight line in the radial direction R at its innermost point is 1.50 mm, which corresponds to 23.1% of the maximum height H2 of the cross-sectional area of the second groove portion 5 in the radial direction R, and at its outermost point is 3.45 mm, which corresponds to 53.1% of the maximum height H2 of the cross-sectional area of the second groove portion 5 in the radial direction R. The straight line 15 is adjoined inward after a curved transition region by the region of the bottom region 6 with the radius of curvature R1.

The two points of the maximum distance Gwmax of the cross-sectional area of the second groove portion 5 perpendicular to the circumferential direction and the straight line 15 on the side 9 of the circumferential groove 1 have generally been selected in such a way that the circumferential groove 1 has both very good wet properties and great transverse rigidity on the two sides 8, 9 of the circumferential groove, as a result of which groove fractures of the circumferential groove are avoided. Overall, the cross-sectional profile of the third groove portion 5 of the circumferential grooves 1 of the inventive pneumatic vehicle tire is generally selected such that a circumferential groove 1 has very good wet properties, e.g. with regard to aquaplaning and good strength against groove fractures, because of the cross-sectional area of the second groove portion 5. The invention is distinguished precisely by this compromise in the properties.

A ratio which very readily describes this property is the ratio of the maximum width Gwmax of the cross-sectional area of the second groove portion 5 to the maximum height H2 of the cross-sectional area in the direction of the radial direction R. In the exemplary embodiment shown in FIG. 3, the maximum width Gwmax perpendicular to the radial direction R of the cross-sectional area is 27.2% greater than the maximum height H2 of the cross-sectional area in the direction of the radial direction R. Furthermore, in the exemplary embodiment, the distance from the radial direction R of the edge point of the cross-sectional area of the second groove portion 5 perpendicular to the circumferential direction with the greatest distance from the radial direction R on the side 9 that faces the outside of the pneumatic vehicle tire is greater than the distance of the edge point on the other side 8 from the radial direction R, which edge point is at the greatest distance from the radial direction R. The distance of the edge point on the side 9 that faces the outside of the pneumatic vehicle tire is 17.9% greater in the exemplary embodiment than the corresponding distance of the edge point from the radial direction R, which edge point is at the maximum distance on the side 8 that faces the center of the pneumatic vehicle tire.

The distance between the edge point of the cross-sectional area of the second groove portion 5 perpendicular to the circumferential direction at the greatest distance from the radial direction R on the side 9 that faces the outside of the pneumatic vehicle tire and the deepest point 7 of the circumferential groove is 3.8 mm in the radial direction R at a maximum height H2 of the cross-sectional area of the second groove portion of 6.5 mm in the radial direction R. Accordingly, the distance from this edge point to the deepest point of the circumferential groove in the radial direction R is 57% of the maximum height H2 of the cross-sectional area of the second groove portion 5. This positioning of the outermost edge point of the side 9 of the circumferential groove that faces the outside of the pneumatic vehicle tire increases the transverse rigidity of this side of the profile of the tread 2.

The distance between the edge point of the cross-sectional area of the second groove portion 5 perpendicular to the circumferential direction at the greatest distance from the radial direction R on the side 8 that is free toward the center of the pneumatic vehicle tire and the deepest point 7 of the circumferential groove 1 is 4 mm in the radial direction R in the exemplary embodiment. Accordingly, the distance between this edge point and the deepest point of the circumferential groove 6 is 61.5% of the maximum height H2 of the cross-sectional area of the second groove portion 5 in the direction of the radial direction R. This positioning of the outermost edge point of the side 8 of the circumferential groove that faces the center of the pneumatic vehicle tire increases the water absorption capacity of the second groove portion 5, as a result of which the contribution of the circumferential groove 1 to the good wet behavior of the pneumatic vehicle tire according to the invention is improved.

In the exemplary embodiment, the bottom region 6 of the circumferential groove 1 has the two radii of curvature R1 and R2 that have already been discussed. These are the main radii of curvature of the two sides 8 and 9 in the bottom region of the circumferential groove 1, i.e. the radii of curvature which define the contour of both sides in the bottom region over the greatest side length. Here, the main radius of curvature R1 of the side 9 of the circumferential groove 1 that faces the outside of the pneumatic vehicle tire is greater in exemplary embodiments of the pneumatic vehicle tires according to the invention, such as that shown in FIG. 3, than the main radius of curvature R2 of the side 8 that faces the center of the pneumatic vehicle tire. In the exemplary embodiment, the main radius of curvature R1 is 4 mm and the main radius of curvature R2 is 2 mm. Accordingly, the main radius of curvature R2, which is located in the bottom region of the side 8 of the circumferential groove 1 that faces the center of the pneumatic vehicle tire, is 50% smaller than the main radius of curvature R1 of the other side. Typically, the main radius of curvature R2, which is located in the bottom region of the side 8 of the circumferential groove 1 that faces the center of the pneumatic vehicle tire is 20% smaller in pneumatic vehicle tires according to the invention than the main radius of curvature R1 in the bottom region of the other side, preferably 35% smaller than the main radius of curvature R1 in the bottom region of the other side and particularly preferably 50% smaller than the main radius of curvature R1 in the bottom region of the other side.

The material of the tread 2 of the pneumatic vehicle tire according to the invention with the second embodiment of a circumferential groove 1 that is shown in FIG. 3 corresponds to that of the first embodiment of a circumferential groove 1 that is shown in FIG. 2.

Figure 4:
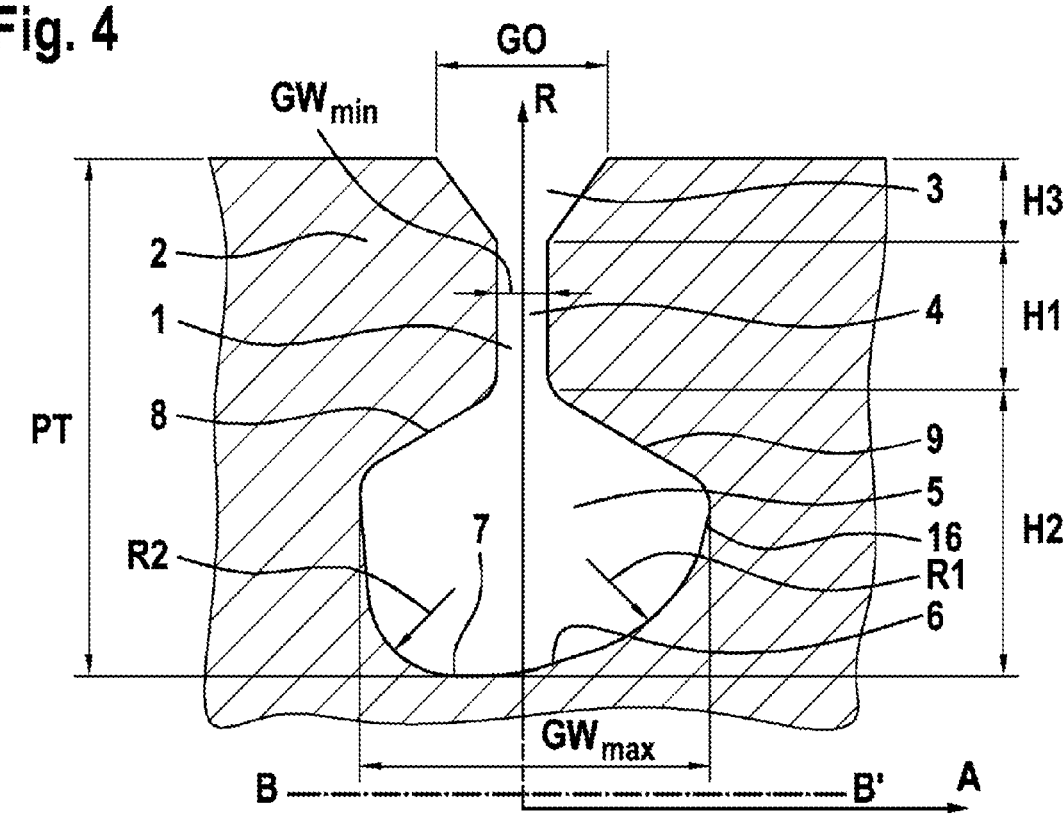
FIG. 4: shows a third embodiment of a circumferential groove according to the invention with three groove portions

FIG. 4 shows a circumferential groove 1 of a third embodiment of a pneumatic vehicle tire according to the invention. Identical and corresponding components are identified by the same reference signs as in the first embodiment shown in FIG. 2.

As in FIG. 2, the cross section of the circumferential groove 1 is shown perpendicularly to the circumferential direction of the pneumatic vehicle tire in the tread 2 of the pneumatic vehicle tire. The circumferential groove 1 is divided here into three groove portions, a first groove portion 4, a second inner groove portion 5 and an outer third groove portion 3. These groove portions are arranged in a radial direction R of the pneumatic vehicle tire.

The first groove portion 4 and the third groove portion 3 are unchanged from the first and second embodiments. Therefore, both the first groove portion 4 and the third groove portion 3 are arranged symmetrically with respect to the radial direction R (shown by the directional arrow R in FIG. 4). Further details on these groove portions can be found in the first embodiment shown in FIG. 2.

Furthermore, the circumferential groove 1 shown in FIG. 4 has a second groove portion 5 which is configured differently than in the first exemplary embodiment shown in FIG. 2. In this second groove portion 5, too, the distance from the circumferential groove 2 to the center of the tire or the hub of the wheel that carries the pneumatic vehicle tire 1 is smallest. Accordingly, the second inner groove portion 5 has, in its bottom region, the bottom region 6 of the circumferential groove 1, a deepest point 7 of the circumferential groove, which is at the greatest distance from the surface of the tread of the pneumatic vehicle tire. In the new state of the pneumatic vehicle tire, this distance is the profile depth PT of the pneumatic vehicle tire. The second inner groove portion 5 adjoining the first groove portion has the largest cross-sectional area of the three groove portions of the circumferential groove. This cross-sectional area is asymmetrical to the radial direction. It extends on both sides of the radial direction and has an edge without corners.

In the plane perpendicular to the circumferential direction of the pneumatic vehicle tire, the circumferential groove 1 has two sides. The side 8 of the circumferential groove faces the center of the pneumatic vehicle tire. The side 9 of the circumferential groove faces the outside of the pneumatic vehicle tire. As in the first exemplary embodiment shown in FIG. 2, both sides of the circumferential groove each have a curvature in the bottom region 6 of the circumferential groove 1, which bottom region is part of the second groove portion 5. The radius of curvature of both sides differs. The radius of the curvature R2 of the side 8 of the circumferential groove that faces the center of the pneumatic vehicle tire is smaller than the radius of curvature R1 of the side 9 of the circumferential groove that faces the outside of the vehicle tire. The radius of curvature R2 of the side 8 of the circumferential groove that faces the vehicle center of the pneumatic vehicle tire is 2 mm in the exemplary embodiment. The radius of curvature R1 of the side 9 of the circumferential groove that faces the outside of the pneumatic vehicle tire is 4 mm. Thus, in the exemplary embodiment, the radius of curvature R2 of the side 8 that faces the center of the vehicle is 50% smaller than the radius of curvature R1 of the other side 9.

The second groove portion 5 has a height H2 of 6.5 mm in the direction R in the direction of the radial direction. Of this height, 78.7% of the height in the inner region of the second groove portion 5 is asymmetrical. The asymmetrical region of the third groove portion 5 therefore has a height of 5.12 mm in the radial direction R.

Compared to the first embodiment of a circumferential groove 1 of a pneumatic vehicle tire according to the invention that is shown in FIG. 2, the edge of the cross-sectional area of the second groove portion 5 in the third embodiment shown in FIG. 4 has a straight line on both sides 8 and 9 and no corners whatsoever or other straight lines. Correspondingly, the entire edge of the cross-sectional area of the second groove portion 5 has curvatures—apart from the two straight lines.

The straight line 16 on the side 9 of the circumferential groove 1 that faces the outside of the pneumatic vehicle tire is designed in such a way that it contributes to increased rigidity of the groove profile, particularly on the side 9.

The straight line 16 is inclined by 13.9° in relation to the radial direction R and converges toward the radial direction R as the depth of the circumferential groove increases. It extends here in the radial direction R over 0.93 mm, which corresponds to 14.3% of the maximum height H2 of the cross-sectional area of the second groove portion 5. The straight line 16 on the side 9 of the circumferential groove that faces the outside of the pneumatic vehicle tire is shorter, in this third embodiment, than the corresponding straight line 15 of the second embodiment and has a smaller inclination in relation to the radial direction.

Typically, in a pneumatic vehicle tire according to the invention, a straight line that belongs to the edge of the cross-sectional area of the second groove portion 5 perpendicular to the circumferential direction extends on the side 9 of the circumferential groove that faces the outside of the pneumatic vehicle tire over at most 45% of the maximum height H2 of the cross-sectional area of the second groove portion 5, preferably over at most 20% of the maximum height H2 of the cross-sectional area of the second groove portion 5 and particularly preferably over at most 5% of the maximum height H2 of the cross-sectional area of the second groove portion 5. Such a straight line typically has an inclination in relation to the radial direction R of at least 5°, preferably at least 20° and particularly preferably of at least 25°. In this case, a longer straight line on the side 9 of the circumferential groove 1 has a greater inclination in relation to the radial direction R. These properties increase the transverse rigidity of the profile of the tread, particularly in its shoulder region.

On both sides 8, 9 of the second groove portion 5 there is in each case a point on the edge of the cross section which is at the greatest distance from the radial direction R. The edge point at the maximum distance from the radial direction R, which edge point is located on the side 8 of the circumferential groove 1 that faces the center of the pneumatic vehicle tire, is at a distance from the radial direction R in the axial direction A of 4 mm. The point of the edge of the cross-sectional area of the second groove portion 5, which is on the side 9 of the circumferential groove 1 that faces the outside of the pneumatic vehicle tire, is at a distance of 4.27 mm from the radial direction R. A maximum width Gwmax of the cross-sectional area of the second groove portion 5 in the axial direction A is also defined by the two points of the maximum distance on both sides 8, 9 of the circumferential groove. In the exemplary embodiment shown, the maximum width Gwmax of the second groove portion 5 is 8.27 mm.

The straight line 16 of the side 9 of the circumferential groove 1 that faces the outside of the pneumatic vehicle tire begins on the side 9, as viewed from the surface of the tread 2 of the pneumatic vehicle tire, almost below the point on the side 9 that is at the greatest distance from the radial direction R. Compared to this point, the straight line is aligned inward toward the center of the tire and reduces the width of the second groove portion 5 by means of its inclination with respect to the radial direction R. Compared to the deepest point 7 of the circumferential groove, the distance of the straight line in the radial direction R at its innermost point is 2.82 mm, which corresponds to 43.4% of the maximum height H2 of the cross-sectional area of the second groove portion 5, and at its outermost point is 3.75 mm, which corresponds to 57.7% of the maximum height H2 of the cross-sectional area of the second groove portion 5. The straight line 16 is adjoined inward after a curved transition region by the region of the bottom region 6 with the radius of curvature R1.

The two points of the maximum distance Gwmax of the cross-sectional area of the third groove portion 5 perpendicular to the circumferential direction and the straight line 16 on the side 9 of the circumferential groove 1 have been selected in such a way that the circumferential groove 1 has both very good wet properties and great transverse rigidity on the two sides 8, 9 of the circumferential groove, as a result of which groove fractures of the circumferential groove are avoided. Overall, the cross-sectional profile of the second groove portion 5 of the circumferential grooves 1 of the inventive pneumatic vehicle tire is selected such that a circumferential groove 1 has very good wet properties, e.g. with regard to aquaplaning and good strength against groove fractures, because of the cross-sectional area of the third groove portion 5. The invention is distinguished precisely by this compromise in the properties.

A ratio which very readily describes this property is the ratio of the maximum width Gwmax of the cross-sectional area of the second groove portion 5 to the maximum height H2 of the cross-sectional area in the direction of the radial direction R. In the exemplary embodiment shown in FIG. 4, the maximum width Gwmax perpendicular to the radial direction R of the cross-sectional area is 27.2% greater than the maximum height H2 of the cross-sectional area in the direction of the radial direction R. Furthermore, in the exemplary embodiment, the distance from the radial direction R of the edge point of the cross-sectional area of the second groove portion 5 perpendicular to the circumferential direction with the greatest distance from the radial direction R on the side 9 that faces the outside of the pneumatic vehicle tire is greater than the distance of the edge point on the other side 8 from the radial direction R, which edge point is at the greatest distance from the radial direction R. The distance of the edge point on the side 9 that faces the outside of the pneumatic vehicle tire is 17.9% greater in the exemplary embodiment than the corresponding distance of the edge point from the radial direction R, which edge point is at the maximum distance on the side 8 that faces the center of the pneumatic vehicle tire.

The distance between the edge point of the cross-sectional area of the second groove portion 5 perpendicular to the circumferential direction at the greatest distance from the radial direction R on the side 9 that faces the outside of the pneumatic vehicle tire and the deepest point 7 of the circumferential groove is 3.8 mm at a maximum height H2 of the cross-sectional area of the third groove portion of 6.5 mm. Accordingly, the distance from this edge point to the deepest point of the circumferential groove in the radial direction R is 58.4% of the maximum height of the cross-sectional area of the third groove portion 5. This positioning of the outermost edge point of the side 9 of the circumferential groove that faces the outside of the pneumatic vehicle tire increases the transverse rigidity of this side of the profile of the tread 2.

The distance between the edge point of the cross-sectional area of the second groove portion 5 perpendicular to the circumferential direction at the greatest distance from the radial direction R on the side 8 that is free toward the center of the pneumatic vehicle tire and the deepest point 7 of the circumferential groove 1 is 4 mm in the exemplary embodiment. Accordingly, the distance between this edge point and the deepest point of the circumferential groove 6 is 61.5% of the maximum height H2 of the cross-sectional area of the second groove portion 5 in the direction of the radial direction R. This positioning of the outermost edge point of the side 8 of the circumferential groove that faces the center of the pneumatic vehicle tire increases the water absorption capacity of the second groove portion 5, as a result of which the contribution of the circumferential groove 1 to the good wet behavior of the pneumatic vehicle tire according to the invention is improved.

The bottom region 6 of the circumferential groove 1 typically has the two radii of curvature R1 and R2, as shown in the exemplary embodiment. In the bottom region 6 of the circumferential groove 1 these are in each case the smallest radii of curvature of both sides 8 and 9 of the circumferential groove 1. Here, the smallest radius of curvature R1 of the side 9 of the circumferential groove 1 in the bottom region 6 that faces the outside of the pneumatic vehicle tire is greater than the smallest radius of curvature R2 of the side 8 in the bottom region 6 that faces the center of the pneumatic vehicle tire. In the exemplary embodiment, the radius of curvature R1 is 4 mm and the radius of curvature R2 is 2 mm. Correspondingly, the radius of curvature R2, which is located in the bottom region 6 of the side 8 of the circumferential groove 1 that faces the center of the pneumatic vehicle tire is 50% smaller than the radius of curvature R1 of the other side 9.

The material of the tread 2 of the pneumatic vehicle tire according to the invention with the third embodiment of a circumferential groove 1 that is shown in FIG. 4 corresponds to that of the first embodiment of a circumferential groove 1 that is shown in FIG. 2.

Figure 5:
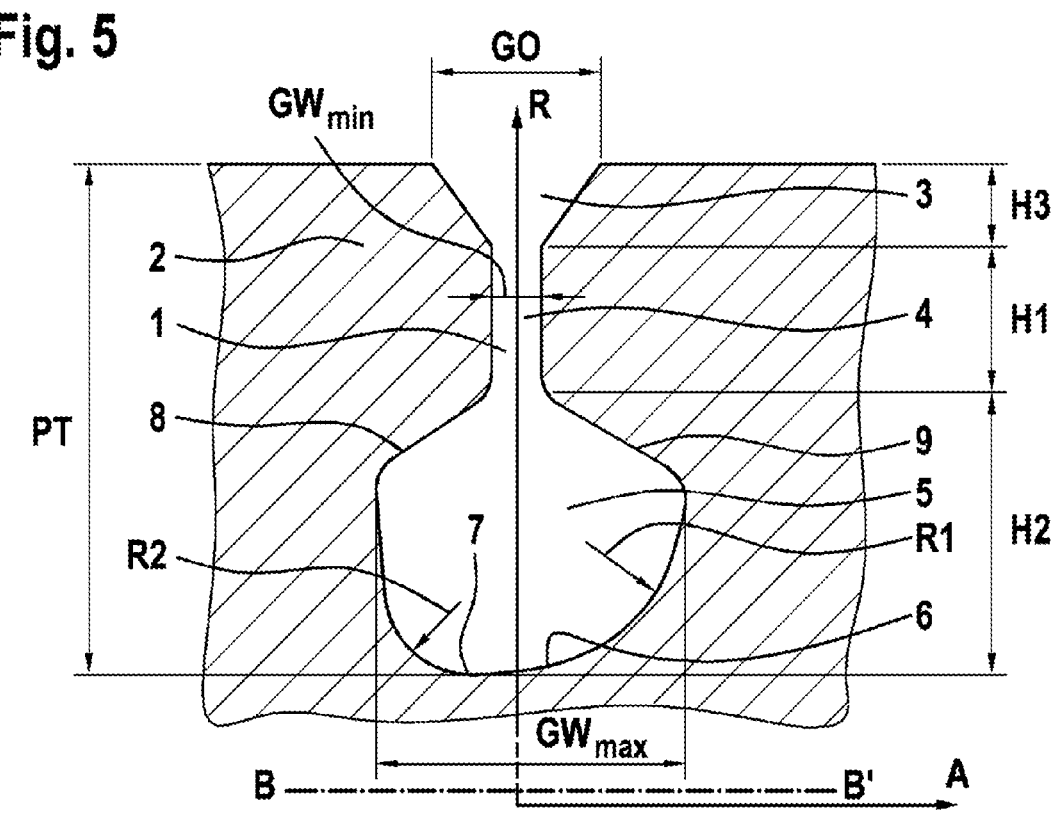
FIG. 5: shows a fourth embodiment of a circumferential groove according to the invention with three groove portions

FIG. 5 shows a circumferential groove 1 of a fourth particularly preferred embodiment of a pneumatic vehicle tire according to the invention. Identical and corresponding components are identified by the same reference signs as in the first embodiment shown in FIG. 2.

As in FIG. 2, the cross section of the circumferential groove 1 is shown perpendicularly to the circumferential direction of the pneumatic vehicle tire in the tread 2 of the pneumatic vehicle tire. Here, the circumferential groove 1 is divided into three groove portions, a first groove portion 4 and a second inner groove portion 5 and an outer third groove portion 3. These three groove portions are arranged in a radial direction R of the pneumatic vehicle tire.

The first groove portion 4 and the third groove portion 3 are unchanged from the first embodiment. Therefore, both the first groove portion 4 and the third groove portion 3 are arranged symmetrically with respect to the radial direction R (shown by the directional arrow R in FIG. 5). Further details on these groove portions can be found in the first exemplary embodiment shown in FIG. 2.

Furthermore, the circumferential groove 1 of the fourth embodiment that is shown in FIG. 5 has a second groove portion 5. In this second groove portion 5, the distance from the circumferential groove 1 to the center of the tire or the hub of the wheel that carries the pneumatic vehicle tire is smallest. Accordingly, the second inner groove portion 5 has, in its bottom region, the bottom region 6 of the circumferential groove 1, a deepest point 7 of the circumferential groove, which is at the greatest distance from the surface of the tread 2 of the pneumatic vehicle tire. In the new state of the pneumatic vehicle tire, this distance is the profile depth PT of the pneumatic vehicle tire. The inner second groove portion 5 adjoining the first groove portion also has the largest cross-sectional area of the three groove portions of the circumferential groove in the fourth embodiment. This cross-sectional area is asymmetrical to the radial direction. It extends on both sides of the radial direction and has an edge without corners.

Both sides of the circumferential groove 1 that is shown in FIG. 5, the side 8 that faces the center of the pneumatic vehicle tire and the side 9 that faces the outside of the pneumatic vehicle tire, each have a curvature in the bottom region 6 of the circumferential groove 1, which bottom region is part of the second groove portion 5. The radius of curvature of both sides differs. The radius of curvature R2 of the curvature of the side 8 of the circumferential groove that faces the center of the pneumatic vehicle tire is smaller than the radius of curvature R1 of the side 9 of the circumferential groove that faces the outside of the vehicle tire. The radius of curvature R2 of the side 8 of the circumferential groove that faces the vehicle center of the pneumatic vehicle tire is 2 mm in the exemplary embodiment. The radius of curvature R1 of the side 9 of the circumferential groove that faces the outside of the pneumatic vehicle tire is 4 mm. Thus, in the exemplary embodiment, the radius of curvature R2 of the side 8 that faces the center of the vehicle is 50% smaller than the radius of curvature of the other side 9. In the exemplary embodiment, the cross-sectional area of the second groove portion 5 is not asymmetrical over its entire height H2 in the radial direction R. The second groove portion 5 has a height H2 of 6.5 mm in the direction R in the direction of the radial direction. Of this height, 76% of the height in the inner region of the second groove portion 5 is asymmetrical. The asymmetrical region of the second groove portion 5 therefore has a height of 4.94 mm in the radial direction R. The cross-sectional area of the second groove portion 5 between the radial direction R and the side 8 of the circumferential groove 1 that faces the center of the pneumatic vehicle tire is approx. 22.2% greater, in the exemplary embodiment shown, than the cross-sectional area of the second groove portion 5 between the radial direction R and the side 9 of the circumferential groove 1 that faces the outside of the pneumatic vehicle tire. Here, the percentage is based on the area between the radial direction R and the side of the circumferential groove that faces the outside of the pneumatic vehicle tire. Looking only at the asymmetrical region of the cross section of the second groove portion 5, the area between the radial direction R and the side 8 of the circumferential groove 1 that faces the center of the pneumatic vehicle tire is even greater by approx . . . 29.7% than the cross-sectional area of the second groove portion between the radial direction R and the side 9 of the circumferential groove 1 that faces the outside of the pneumatic vehicle tire. The ratio of the areas between the individual sides 8 and 9 of the circumferential groove 1 and the radial direction R, together with the geometry of the cross-sectional area, is essential for the optimum behavior of the circumferential groove 1 both in terms of the wet behavior and the transverse rigidity of the profile of the tread of the pneumatic vehicle tire.

Also in the fourth exemplary embodiment of a circumferential groove 1 of a pneumatic vehicle tire according to the invention that is shown in FIG. 5, the edge of the cross-sectional area of the second groove portion 5 has only a straight line on the side 8 that faces the center of the vehicle tire and no corners whatsoever or other straight lines. Correspondingly, the entire edge of the cross-sectional area of the second groove portion 5—apart from the straight line—only has curvatures. This leads to an increased rigidity of the groove profile, in particular on the side of the circumferential groove 1 that faces the outside of the vehicle tire, i.e. the side 9.

In the first embodiment, the straight line on the side 8 that faces the center of the vehicle tire has an angle with respect to the radial direction R of 8.4°. The distance between the straight lines and the radial direction R is reduced here as the distance from the surface of the tread 2 increases.

On both sides 8, 9 of the second groove portion 5 there is in each case a point on the edge of the cross section which is at the greatest distance from the radial direction R. The edge point at the maximum distance from the radial direction R, which edge point is located on the side 8 of the circumferential groove 1 that faces the center of the pneumatic vehicle tire, is at a distance from the radial direction R in the axial direction A of 3.45 mm. In addition, this point of the maximum distance is at a distance in the radial direction R of 4.2 mm from the deepest point 7 of the second groove portion 5. The point of the edge of the cross-sectional area of the second groove portion 5, which is on the side 9 of the circumferential groove 1 that faces the outside of the pneumatic vehicle tire, is at a distance of 3.95 mm from the radial direction R. In addition, this point is at a distance in the radial direction R of 4.0 mm from the deepest point 7 of the circumferential groove 1. A maximum width Gwmax of the cross-sectional area of the third groove portion 5 is also defined by the two points of the maximum distance on both sides 8, 9 of the circumferential groove. In the exemplary embodiment shown, the maximum width Gwmax of the second groove portion 5 is 7.4 mm. The two points of the maximum distance Gwmax of the cross-sectional area of the second groove portion 5 perpendicular to the circumferential direction have been selected in such a way that the circumferential groove 1 has both very good wet properties and great transverse rigidity of the two sides 8 and 9 of the circumferential groove, as a result of which groove fractures of the circumferential groove are avoided. Overall, the cross-sectional profile of the second groove portion 5 of the circumferential grooves 1 of the inventive pneumatic vehicle tire is selected such that a circumferential groove 1 has very good wet properties. e.g. with regard to aquaplaning and good strength against groove fractures, because of the cross-sectional area of the second groove portion 5. The circumferential groove 1 shown in FIG. 5 is distinguished by a very good compromise between these properties.

A ratio which very readily describes this property is the ratio of the maximum width Gwmax of the cross-sectional area of the second groove portion 5 to the maximum height H2 of the cross-sectional area in the direction of the radial direction R. In the fourth exemplary embodiment that is shown in FIG. 5, the maximum width Gwmax perpendicular to the radial direction R of the cross-sectional area is 13.8% greater than the maximum height H2 of the cross-sectional area in the direction of the radial direction R. Furthermore, in the exemplary embodiment, the distance from the radial direction R of the edge point of the cross-sectional area of the second groove portion 5 perpendicular to the circumferential direction at the greatest distance from the radial direction R on the side 9 that faces the outside of the pneumatic vehicle tire is greater than the distance of the edge point on the other side 8 from the radial direction R, which edge point is at the greatest distance from the radial direction R. The distance of the edge point on the side 9 that faces the outside of the pneumatic vehicle tire is 16.7% greater in the exemplary embodiment than the corresponding distance of the edge point from the radial direction R, which edge point is at the maximum distance on the side 8 that faces the center of the pneumatic vehicle tire.

The distance between the edge point of the cross-sectional area of the second groove portion 5 perpendicular to the circumferential direction at the greatest distance from the radial direction R on the side 9 that faces the outside of the pneumatic vehicle tire and the deepest point 7 of the circumferential groove is 4.0 mm in the radial direction at a maximum height H2 of the cross-sectional area of the second groove portion of 6.5 mm. Accordingly, the distance from this edge point to the deepest point of the circumferential groove In the radial direction R is 61.5% of the maximum height H2 of the cross-sectional area of the second groove portion 5. This positioning of the outermost edge point of the side 9 of the circumferential groove that faces the outside of the pneumatic vehicle tire increases the transverse rigidity of this side of the profile of the tread 2.

The distance between the edge point of the cross-sectional area of the second groove portion 5 perpendicular to the circumferential direction at the greatest distance from the radial direction R on the side 8 that is free toward the center of the pneumatic vehicle tire and the deepest point 7 of the circumferential groove 1 is 4.2 mm in the radial direction R in the exemplary embodiment. Accordingly, the distance between this edge point and the deepest point 7 of the circumferential groove 1 is 64.6% of the maximum height H2 of the cross-sectional area of the second groove portion 5 in the direction of the radial direction R. This positioning of the outermost edge point of the side 8 of the circumferential groove that faces the center of the pneumatic vehicle tire increases the water absorption capacity of the second groove portion 5, as a result of which the contribution of the circumferential groove 1 to the good wet behavior of the pneumatic vehicle tire according to the invention is improved.

In the exemplary embodiment shown in FIG. 5, the bottom region 6 of the circumferential groove 1 has the two radii of curvature R1 and R2. In the bottom region 6 of the circumferential groove 1 these are in each case the smallest radii of curvature of both sides 8 and 9 of the circumferential groove 1. Here, the smallest radius of curvature R1 of the side 9 of the circumferential groove 2 in the bottom region 6 that faces the outside of the pneumatic vehicle tire is greater than the smallest radius of curvature R2 of the side

8 in the bottom region 6 that faces the center of the pneumatic vehicle tire. In the exemplary embodiment of FIG. 5, the radius of curvature R1 is 4 mm and the radius of curvature R2 is 2 mm. Correspondingly, the radius of curvature R2, which is located in the bottom region of the side 8 of the circumferential groove 2 that faces the center of the pneumatic vehicle tire is 50% smaller than the radius of curvature R1 of the other side 9.

Figure 6:
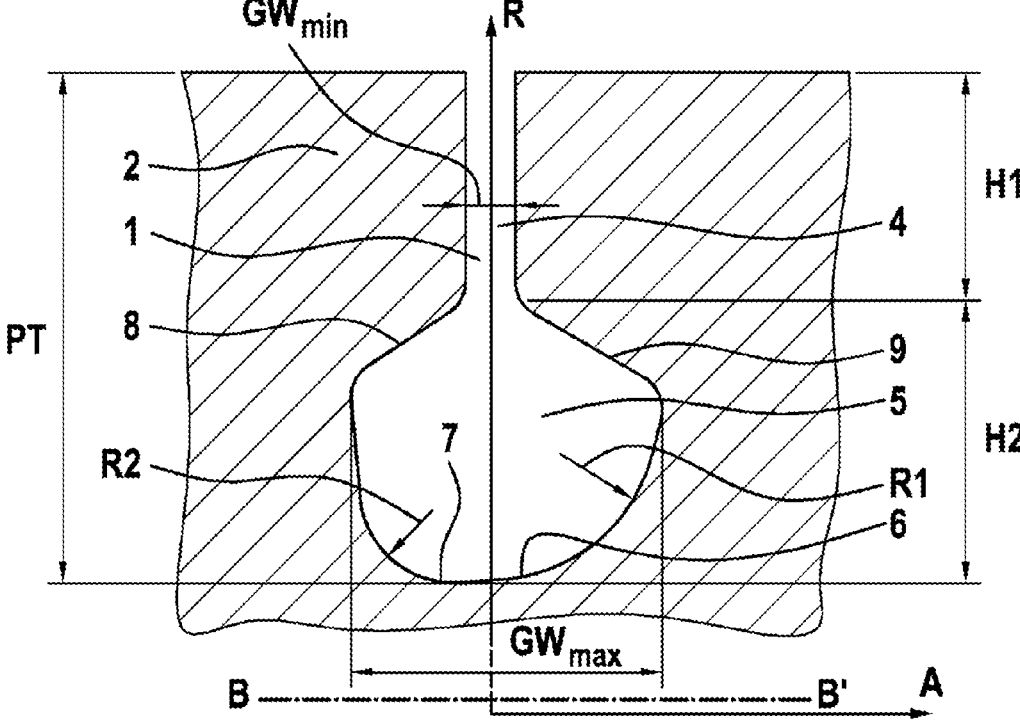
FIG. 6: shows a fifth embodiment of a circumferential groove according to the invention with two groove portions

FIG. 6 shows a circumferential groove 1 of a fifth embodiment of a pneumatic vehicle tire according to the invention. Identical and corresponding components are identified by the same reference signs as in the fourth embodiment shown in FIG. 5.

As in FIG. 5, the cross section of the circumferential groove 1 is shown perpendicularly to the circumferential direction of the pneumatic vehicle tire in the tread 2 of the pneumatic vehicle tire. In contrast to the previously shown embodiments, however, the circumferential groove 1 is divided here only into two groove portions, a first outer groove portion 4 and a second inner groove portion 5. These groove portions are arranged in a radial direction R of the pneumatic vehicle tire.

The first groove portion 4 is arranged symmetrically with respect to the radial direction. The first outer groove portion 4 ends at the surface of the tread 2 of the pneumatic vehicle tire. In the exemplary embodiment shown, it has a constant width $GW_{min}$ in the axial direction A over its extent in the radial direction R of 1.2 mm. The first radial groove portion has a height H1 of 5.5 mm in the direction of the radial direction R.

In other such embodiments of the pneumatic vehicle tire according to the invention with circumferential grooves 1, which are made up only of the first outer groove portion 4 and a second inner groove portion 5, the height H1 of the first radial groove portion in the direction of the radial direction R is typically 2 mm to 11 mm, preferably 4 mm to 9 mm and particularly preferably 5 mm to 7 mm.

The second inner groove portion 5 adjoining the first groove portion 4 in the fifth embodiment shown in FIG. 6 has a cross section in the axial direction A that is made wider than this width $GW_{min}$. The second inner groove portion 5 of the fifth embodiment shown in FIG. 6 is unchanged here from that of the fourth embodiment shown in FIG. 5.

Figure 7:
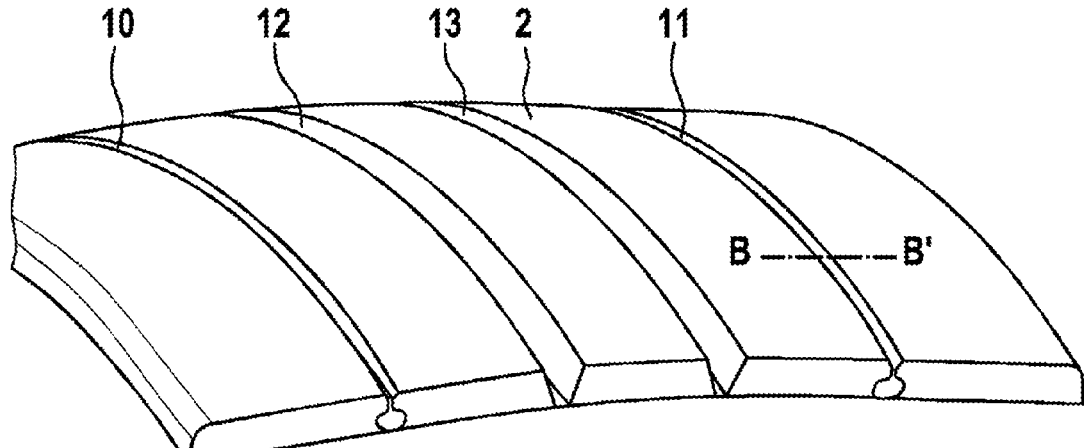
FIG. 7: shows a tread of a pneumatic vehicle tire according to the invention with two outer grooves which have three groove portions in the radial direction, in which the inner groove portion is asymmetrical in the axial direction

FIG. 7 shows the tread 2 of a pneumatic vehicle tire according to the invention. The tread has four circumferential grooves, the outer grooves 10 and 11 and the inner grooves 12 and 13. The two outer grooves 10 and 11 have a cross section perpendicular to the circumferential direction, as shown in FIGS. 2 to 5. Accordingly, the two outer grooves 10 and 11 have three groove portions 3, 4 and 5. On the other hand, the two inner grooves 12 and 13 have a V-shaped or U-shaped cross section perpendicular to the circumferential direction of the tire.

Accordingly, FIGS. 2 to 5 show the circumferential groove in a cross section along the section line BB' shown in FIG. 7.

Owing to the inventive design of the outer grooves 10, 11 of the pneumatic vehicle tire shown, the pneumatic vehicle tire has very good wet properties, in particular with regard to aquaplaning, and nevertheless great transverse rigidity, by means of which the formation of groove fractures is avoided. This improvement in the profile of the outer grooves 10, 11 takes into account in particular a permanently even rolling and thus a permanently uniform stress on the pneumatic vehicle tire and also the lateral forces that act on the pneumatic vehicle tire during operation of the vehicle, as a result of which the shoulder region of the pneumatic vehicle tire is particularly stressed.

Figure 8:
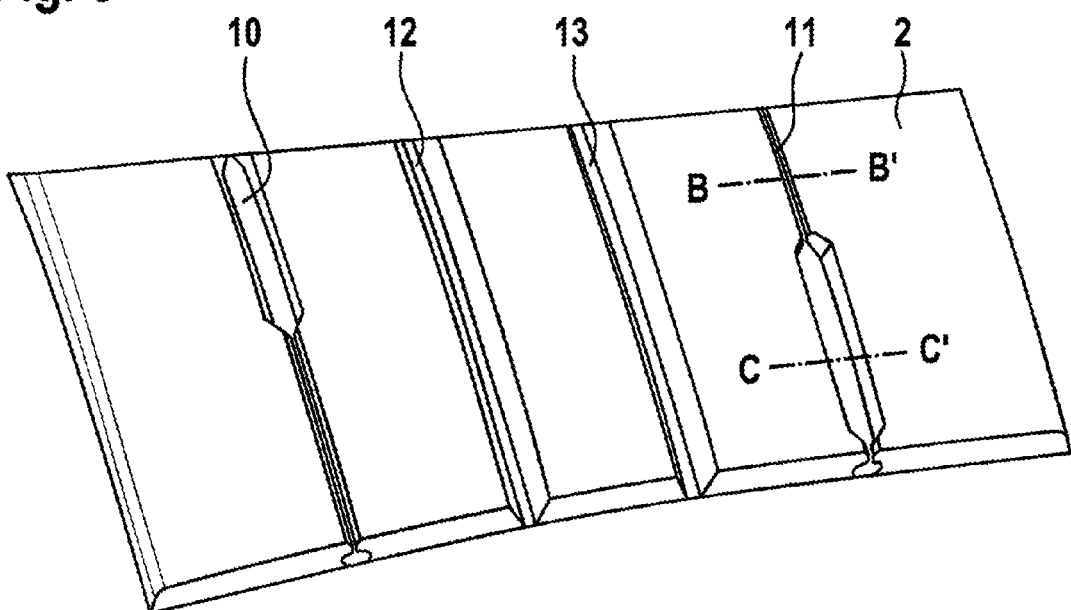
FIG. 8: shows a tread of a pneumatic vehicle tire according to the invention with two outer grooves which alternately have an asymmetrical U profile over the circumference and three groove portions in the radial direction, the inner groove portion of which is asymmetrical in the axial direction

FIG. 8 shows the tread 2 of a further embodiment of a pneumatic vehicle tire according to the invention. The tread 2 also has four circumferential grooves here. These are two outer grooves 10, 11 and two inner grooves 12, 13. The inner grooves 12, 13 have a U-shaped profile that can alternatively also be V-shaped in design. Both outer grooves 10, 11 have two different cross sections perpendicular to the circumferential direction in parts of the circumference. The parts with the two different cross sections of the circumferential groove alternate over the circumference perpendicularly to the circumferential direction. At the end of a part, one cross section of the circumferential groove merges into the other cross section of the circumferential groove. In parts of the circumferential groove, the cross section of the circumferential groove is made up of three groove portions 3, 4 and 5 which adjoin one another and are arranged one behind the other in the radial direction R of the pneumatic vehicle tire. Such cross sections of the circumferential groove of a pneumatic vehicle tire according to the invention have been described previously and are shown by way of example in FIGS. 2 to 5. FIG. 8 shows the line B, B' in such a part. It runs through the circumferential groove 11 in the axial direction of the tread 2. The line B, B' is also shown in FIGS. 2 to 5, along which the cross section of the circumferential groove 1 is shown in the figures. In general, the cross section in this circumferential section is distinguished by the properties that are reproduced in claim 1. Various embodiments of this cross section of the circumferential groove have already been described previously and can also be used in FIG. 8 in the tread 2 of the pneumatic vehicle tire. In another part of the circumference of the circumferential groove 11, along the line C, C', there is a cross section of the circumferential groove 11 perpendicular to the circumferential direction that has a V-shaped and preferably a U-shaped profile. Preferably, the U-shaped profile is asymmetrical, with the side 8 of the circumferential groove that faces the center of the vehicle having a smaller radius of curvature in the bottom region 6 of the circumferential groove. The cross section used in this part of the circumferential groove is known, for example, from DE 10 2005 042 903 A1. In the embodiment shown in FIG. 8, the parts with an alternating cross section in the circumferential direction have the same length. However, different length ratios of the parts with the different cross sections are also possible. Typically, the portion of the length of the parts of the circumference of the pneumatic vehicle tire, which has a cross section made up of at least two groove portions 4 and 5 adjoining one another in the radial direction R of the pneumatic vehicle tire, compared to the total length of the parts over the tire circumference, in which both this cross section and the second cross section, which typically has a U profile, are present is between 23% and 75% of the circumference, preferably between 30% and 70% of the circumference, and particularly preferably between 40% and 60% of the circumference.

If the parts of the two cross sections present in the circumferential groove have the same length, in the preferred embodiment shown in FIG. 8 the arrangement of the parts on the two outer grooves 10 and 11 is such that the one cross section of the circumferential groove is present in one of the two outer grooves and the other cross section of the circumferential groove is present in the same part of the other outer groove. If the parts for both cross sections in the circumferential groove do not have the same length in the circumferential direction, the parts are preferably arranged on both outer grooves in such a way that the center of the part with a cross section made up of at least two groove portions adjoining one another in the radial direction of the pneumatic vehicle tire is arranged on one outer groove in the circumferential direction in such a way that the center of the part having the other cross-sectional profile, which is preferably a U profile, is arranged on the other outer groove in the circumferential direction at the same location.

The alternating cross sections on the outer grooves of the tire ensure that the preferably U-shaped profile absorbs large amounts of water when wet and the other outer groove absorbs a relatively large amount of water in the second groove portion 5. It is thus ensured that the tread 2 of the pneumatic tire can absorb a uniform amount of water at each circumferential point in order to counteract the risk of aquaplaning. Furthermore, both outer grooves have a high transverse rigidity over the entire circumference because of the two different cross sections, in order to counteract groove fractures. In addition, the narrowed first groove portion 4 of the cross section of the circumferential grooves 10, 11, when made up of the at least two groove portions 4 and 5, ensures improved, i.e. reduced, rolling resistance in the parts of the circumference that have such a cross section.

Figure 9:
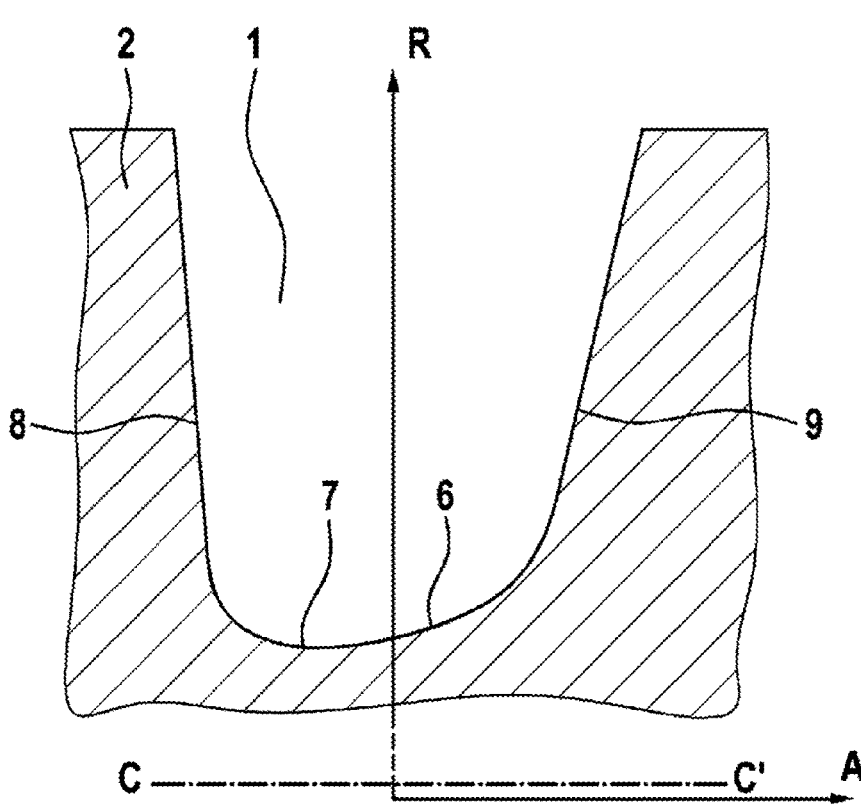
FIG. 9: shows an asymmetric U profile of a circumferential groove

FIG. 9 once again shows the cross section of the circumferential grooves 10 and 11 when the part of these outer grooves 10, 11 has a U-shaped profile. This profile is shown along section line C, C' shown in FIG. 8. It can be seen from FIG. 9 that the bottom region 6 of the circumferential groove 1 shown has different radii of curvature. Here, the radius of curvature of the side 8 of the circumferential groove that faces the center of the pneumatic vehicle tire is smaller than the radius of curvature of the side 9 of the circumferential groove 1 that faces the outside of the pneumatic vehicle tire. This profile of the circumferential groove, which has only one groove portion, increases the transverse rigidity of the profile of the tread 2 in the shoulder region of the pneumatic vehicle tire.

Figure 10:
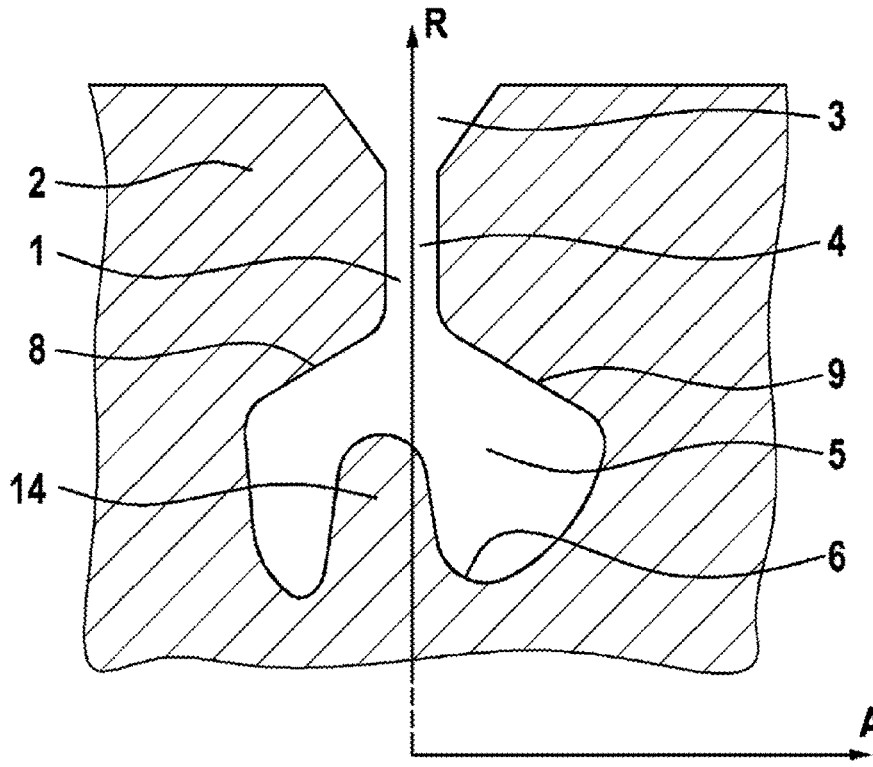
FIG. 10: shows a sixth embodiment of a circumferential groove according to the invention having three groove portions and a structure in the inner groove portion which makes it difficult or impossible for small foreign bodies to enter the groove

FIG. 10 shows a further sixth embodiment of a pneumatic vehicle tire according to the invention. A circumferential groove 1 of the pneumatic vehicle tire is shown in detail, with its cross-sectional profile perpendicular to the circumferential direction consisting of three groove portions, which are arranged one behind the other in the radial direction R. A structure 14 facing outward in the radial direction R is arranged in the second groove portion 5, the radially inner groove portion, starting from the bottom region 6 of the circumferential groove 1, which is intended to make it difficult or impossible for small foreign bodies to penetrate. Otherwise, the sides 8 and 9 of the circumferential groove 1 are designed in exactly the same way as those in the circumferential groove 1 shown in FIG. 2. Accordingly, the structure of the second groove portion 5 is changed only by the additional structure 14 facing outward. The area of the asymmetrical region of the second groove portion 5 is changed by the structure 14 that faces outward. The area ratios of the asymmetrical region of the second groove portion also change accordingly. Such a circumferential groove is then part of a pneumatic vehicle tire according to the invention if its cross section perpendicular to the circumferential direction, without taking into consideration the cross-sectional area of the structure 14 perpendicular to the circumferential direction, which structure is additionally arranged in the bottom region of the circumferential groove 1 and faces radially outward, has a cross-sectional area with the properties described previously of a pneumatic vehicle tire according to the invention. In this exemplary embodiment, the sixth embodiment, i.e. compared to the previously described embodiments, the structure 14 is only additionally arranged in the bottom region 6 of the circumferential groove 1, which bottom region is usually part of the second groove portion.

The additional structure 14 arranged in the bottom region 6 can have angular structures, such as a point, in the region which faces outward in the radial direction and is no longer arranged in the bottom region 6 of the circumferential groove 1. A point is a structure where the slope of a surface merges discontinuously from one value to the other. The structure 14 can therefore have one degree in the circumferential direction.

In a pneumatic vehicle tire according to the invention, the circumferential grooves, which are made up of at least two groove portions 4 and 5 adjoining one another in the radial direction of the pneumatic vehicle tire, typically have a profile depth PT of 5 mm to 18 mm, preferably a profile depth PT of 6 mm to 16 mm, and particularly preferably a profile depth PT of 9 mm to 15 mm.

If a third groove portion 3 is also present, its width GO in the axial direction A on the surface of the tread 2 in the new state of the pneumatic vehicle tire according to the invention is typically 1 mm to 5.5 mm, preferably 3 mm to 5 mm and particularly preferably 3.7 mm to 4.5 mm.

If a third groove portion 3 is present in the cross section of a circumferential groove 1, its height H3 in the radial direction R of these circumferential grooves 1 in the new state of the pneumatic vehicle tire according to the invention is typically 1 mm to 5 mm, preferably 1.5 mm to 4 mm and particularly preferably 1.7 mm to 2.5 mm.

If there is also a third groove portion 3 in the cross section of a circumferential groove 1, the height H1 of the first groove portion 4 in the radial direction R of these circumferential grooves 1 is typically 1.5 mm to 9 mm, preferably 2.5 mm to 8 mm and particularly preferably 3.0 mm to 7.5 mm. The height H1 of the first groove portion 4 typically corresponds to at least 20% of the profile depth PT, preferably at least 25% of the profile depth PT and particularly preferably at least 28% of the profile depth PT in the new state of the pneumatic vehicle tire.

The height H2 of the second groove portion 5 in the radial direction R of these circumferential grooves 1 is typically 3 mm to 11 mm, preferably 4 mm to 9.5 mm and particularly preferably 5 mm to 8 mm. The height H2 of the second groove portion 5 typically corresponds to at least 40% of the profile depth PT, preferably at least 45% of the profile depth PT and particularly preferably at least 50% of the profile depth PT in the new state of the pneumatic vehicle tire.

The nominal width of the pneumatic vehicle tires according to the invention is typically 280 mm to 460 mm, preferably 290 mm to 400 mm and particularly preferably 300 mm to 330 mm. In the embodiments shown in FIGS. 5 and 6, the nominal width of the pneumatic vehicle tire shown is 315 mm. The nominal width of the pneumatic vehicle tires is defined according to the standard ISO 5775.

The nominal cross-sectional ratio, i.e. the ratio of the tire height to the nominal width, is typically 40% to 95%, preferably 45% to 80% and particularly preferably 50% to 70% for pneumatic vehicle tires according to the invention. In the embodiments of FIGS. 7 and 8, the ratio of tire height to nominal width is 70%.

The pneumatic vehicle tires according to the invention typically have 2 to 6 grooves, preferably 3 to 5 grooves and particularly preferably 4 circumferential grooves.

The distance between the outer grooves of the pneumatic vehicle tires according to the invention and the shoulder of the pneumatic vehicle tire is typically 40 mm to 70 mm, preferably 45 mm to 65 mm and particularly preferably 50 mm to 55 mm. In the embodiments of FIGS. 7 and 8, this distance is 52 mm.

The pneumatic vehicle tires according to the invention are used on wheels which preferably have a rim diameter of 19.5 inches and particularly preferably a rim diameter of 22.5 inches.

The pneumatic vehicle tires according to the invention are preferably used on buses and trucks. Typically, they are used for light trucks, preferably for medium-duty trucks, especially with a total weight in excess of 7.2 tons, and very particularly preferably for heavy-duty trucks. The pneumatic vehicle tires according to the invention are used here particularly for steering wheels and trailer wheels. The pneumatic vehicle tires according to the invention are distinguished by low rolling resistance and tire abrasion. In addition, in particular in the case of the wheels discussed, the configuration according to the invention of the cross sections of the circumferential grooves achieves a significant reduction in the formation of cracks in the tread profile, especially at the base of the groove. In particular, the configuration of the circumferential grooves according to the invention makes it possible to use the tires for long-distance vehicles for a significantly longer period of time. It is precisely here that the tires are subject to permanent, uniform loading, particularly in the shoulder region of the profile. The uniform load is greatest on the steering wheels, since their load does not depend on the vehicle loading and does not vary as a result. The new profile design is capable of addressing these problems in a targeted manner and of absorbing the stressing forces in a manner appropriate to the load and of dissipating them in the tire tread.

The pneumatic vehicle tires according to the invention have circumferential grooves with an improved profile, which contributes both to better wet properties, in particular with regard to aquaplaning, and also increases the transverse rigidity of the tires and thus the durability of the tires. In particular, groove fractures in the shoulder region of the pneumatic vehicle tires are avoided by these new circumferential grooves. In addition, the circumferential grooves with the improved profile also contribute to an advantageous, namely lower rolling resistance.

Pneumatic vehicle tires according to the invention can have the features of individual described embodiments of a pneumatic vehicle tire according to the invention or a combination of the features of different described embodiments. This is in particular because the described embodiments only represent examples of the pneumatic vehicle tires according to the invention for explaining the invention.

LIST OF REFERENCE SIGNS

1 Circumferential groove
2 Tread of a pneumatic vehicle tire
3 Outer third groove portion
4 First groove portion
5 Second groove portion
6 Bottom region of the circumferential groove
7 Deepest point of the circumferential groove
8 Side of the circumferential groove that faces the center of the pneumatic vehicle tire
9 Side of the circumferential groove that faces the outside of the pneumatic vehicle tire
10 Outer groove of the pneumatic vehicle tire
11 Outer groove of the pneumatic vehicle tire
12 Inner groove of the pneumatic vehicle tire

13 Inner groove of the pneumatic vehicle tire

14 Structure in the bottom region of the circumferential groove

15 Specifically the side of the circumferential groove of the second exemplary embodiment that faces the outside of the pneumatic vehicle tire

16 Specifically the side of the circumferential groove of the second exemplary embodiment that faces the outside of the pneumatic vehicle tire A Axial direction R Radial direction GO Width of the first groove portion on the surface of the tread Gwmax Maximum width of the cross-sectional area of the third groove portion Gwmin Width of the first groove portion at its innermost point H1 Height of the first groove portion H2 Height of the second groove portion H3 Height of the third groove portion PT Profile depth of the pneumatic vehicle tire R1 Radius of curvature of the side that faces outside, in the bottom region R2 Radius of curvature of the side that faces the center of the tire, in the bottom region

The invention claimed is:

1. A pneumatic vehicle tire comprising:

a tread (2) having a profiling and which has a circumferential groove (1) which runs in encircling fashion in a circumferential direction of the tire;

the groove being formed to a profile depth PT and comprising, in cross section perpendicularly to the circumferential direction, a first groove portion (4) and a second groove portion (5) adjoining one another in a radial direction R, with the second groove portion (5) being radially inward of the first groove portion (4), the first groove portion (4), in cross section, being symmetrical with respect to the radial direction R and having a width in the axial direction A perpendicular to the radial direction R that is less than 3 mm and does not vary by more than 10%, the second groove portion (5), in cross section, being wider in the axial direction A in comparison with the first groove portion (4), and having the largest cross-sectional area of all the groove portions, and the cross-sectional area of the second groove portion (5) being asymmetrical to the radial direction R, and extending on both sides of the radial direction R and having a border without corners in a bottom region (6) of the circumferential groove (1), wherein the cross-sectional area of the second groove portion (5) between an imaginary line running in the radial direction R and the side (8) of the circumferential groove (1) pointing to the center of the vehicle tire is between 10% smaller and 15% larger than the cross-sectional area of the second groove portion (5) between the imaginary line running in the radial direction R and the side (9) of the circumferential groove (1), which points to the outside of the vehicle pneumatic tire;

wherein, in cross section, the imaginary line running in the radial direction R is centrally axially located to axially bisect the width in the axial direction A of the first groove portion (4).

2. The tire of claim 1, wherein edges in the bottom region (6) of the circumferential groove (1) in the second groove portion (5) only have rounded portions.

3. The tire of claim 1, wherein in the bottom region (6) of the circumferential groove (1), a side (8) of the circumferential groove (1) in the second groove portion (5) has a curvature R2 with a smallest radius of curvature and faces a center of the tire.

4. The tire of claim 3, wherein in the bottom region (6) of the circumferential groove (1), on the side (8) of the circumferential groove (1) in the second groove portion (5) which faces a center of the pneumatic vehicle tire, the smallest radius of curvature R2 is at least 20% smaller than a smallest radius of curvature R1 of a curvature of an opposite side (9) of the circumferential groove (1) in the second groove portion (5).

5. The tire of claim 1, wherein the circumferential groove (1) is an outer groove (10, 11) of the pneumatic vehicle tire.

6. The tire of claim 1, wherein over at least 35% of the height H2 of the second groove portion (5) in the radial direction R, the cross-sectional area of the second groove portion (5), starting from the bottom region (6) of the circumferential groove (1), is asymmetrical to the radial direction R.

7. The tire of claim 1, wherein over at least 70% of the height H2 of the second groove portion (5) in the radial direction R, the cross-sectional area of the second groove portion (5), starting from the bottom region (6) of the circumferential groove (1), is asymmetrical to the radial direction R.

8. The tire of claim 1, wherein, in cross section, a maximum width Gwmax of the cross-sectional area of the second groove portion (5) perpendicular to the radial direction R is 20% smaller to 50% greater than the maximum height H2 of the cross-sectional area of the second groove portion (5) in the direction of the radial direction R.

\* \* \* \* \*